US008048529B2

(12) United States Patent
Lewno

(10) Patent No.: US 8,048,529 B2
(45) Date of Patent: Nov. 1, 2011

(54) VEHICULAR REAR SLIDING WINDOW ASSEMBLY

(75) Inventor: Jeffrey A. Lewno, Hudsonville, MI (US)

(73) Assignee: Magna Mirrors of America, Inc, Holland, MI (US)

( * ) Notice: Subject to any disclaimer, the term of this patent is extended or adjusted under 35 U.S.C. 154(b) by 0 days.

(21) Appl. No.: 12/946,314

(22) Filed: Nov. 15, 2010

(65) Prior Publication Data

US 2011/0056140 A1 Mar. 10, 2011

Related U.S. Application Data

(63) Continuation of application No. 11/969,561, filed on Jan. 4, 2008, now Pat. No. 7,838,115, which is a continuation of application No. 10/847,088, filed on May 17, 2004, now Pat. No. 7,332,225, which is a continuation of application No. 10/054,016, filed on Nov. 13, 2001, now Pat. No. 6,846,039, which is a continuation of application No. 09/520,582, filed on Mar. 8, 2000, now Pat. No. 6,319,344, which is a continuation of application No. 09/213,706, filed on Dec. 17, 1998, now Pat. No. 6,068,719, which is a continuation of application No. 08/924,405, filed on Aug. 22, 1997, now Pat. No. 5,853,895, which is a continuation of application No. 08/420,233, filed on Apr. 11, 1995, now abandoned.

(51) Int. Cl.
*B32B 27/00* (2006.01)
*E05D 15/06* (2006.01)

(52) U.S. Cl. ........... 428/425.6; 49/130; 49/404; 49/413; 49/428

(58) Field of Classification Search ............... 428/425.6; 49/130, 404, 413, 428
See application file for complete search history.

(56) References Cited

U.S. PATENT DOCUMENTS

| | | | |
|---|---|---|---|
| 226,770 A | 4/1880 | Morse | |
| 675,762 A | 6/1901 | Walradt | |
| 1,199,868 A | 10/1916 | Browne | |
| 1,763,603 A | 6/1930 | Donahue | |
| 1,809,132 A | 6/1931 | Martin | |
| 1,963,941 A | 6/1934 | Duffy | |
| 2,253,818 A | 8/1941 | Simpson | |
| 2,282,980 A | 5/1942 | Guy | |
| 2,390,260 A | 12/1945 | King | |
| 2,502,970 A | 4/1950 | Manning | |
| 2,507,965 A | 5/1950 | Eichner | |
| 2,555,204 A | 5/1951 | Sorrell | |
| 2,566,745 A | 9/1951 | Parsons | |
| 2,592,411 A | 4/1952 | Frohnapel | |
| 2,597,539 A | 5/1952 | Smart | |
| 2,608,926 A | 9/1952 | Helsley | |
| 2,617,481 A | 11/1952 | Frohnapel | |
| 2,679,201 A | 5/1954 | Scharmen | |
| 2,701,162 A | 2/1955 | Kliger | |
| 2,701,631 A | 2/1955 | Stouder et al. | |
| 2,721,361 A | 10/1955 | Ryan et al. | |
| 2,721,636 A | 10/1955 | Ordorica et al. | |
| 2,738,838 A | 3/1956 | Sutter | |
| 2,770,312 A | 11/1956 | Silverman | |
| 2,781,835 A | 2/1957 | Westman | |
| 2,829,081 A | 4/1958 | Sweem | |
| 2,836,457 A | 5/1958 | Beerman et al. | |
| 2,894,784 A | 7/1959 | Howard | |
| 2,946,098 A | 7/1960 | Migheault et al. | |
| 2,948,015 A | 8/1960 | Hansen | |
| 2,996,221 A | 8/1961 | Grise | |
| 3,032,808 A | 5/1962 | Fleming | |
| 3,052,496 A | 9/1962 | Frey | |
| 3,134,112 A | 5/1964 | Hage | |
| 3,155,204 A | 11/1964 | Campbell et al. | |
| 3,237,250 A | 3/1966 | Scoville | |
| 3,274,740 A | 9/1966 | Hall | |
| 3,282,014 A | 11/1966 | Bamford et al. | |
| 3,321,234 A | 5/1967 | Harrell et al. | |

(Continued)

FOREIGN PATENT DOCUMENTS

BE 358158 2/1928

(Continued)

OTHER PUBLICATIONS 1970 to 1978 Capri Parts, Team Blitz Parts Source, Advertising Literature, allegedly made public more than one year prior to the present application.
1994 Mercury Villager brochure.
1996 Dodge Caravan brochure.
A. Goel, New Hybrid Structural Adhesive for Reinforced Plastics, Composites Institute, SPI, Feb. 1987.
A. J. Kinloch, Adhesion and Adhesives, Science and Technology, Chapman and Hall,1987.
A. Pizzi and K. L. Mittal, Handbook of Adhesive Technology, Marcel Dekker Inc., 1994.
A. Pocius, Third Generation Two-Part Epoxy Adhesives, 19th Int'l Sample Technical Conference, Oct. 1987.

(Continued)

*Primary Examiner* — Edward Cain
(74) *Attorney, Agent, or Firm* — Gardner, Linn, Burkhart & Flory, LLP

(57) ABSTRACT

A rear sliding window assembly suitable for use in a vehicle includes upper and lower track members and at least one fixed glass window panel. The track members are disposed at a surface of the fixed glass window panels and no portion of the track members is in contact with the opposite surface of the fixed glass window panels. A movable glass window panel is slidably disposed at the track members and movable at least partially along the track members relative to the fixed glass window panel or panels. The movable glass window panel is movable between opened and closed positions. A perimeter edge of the movable glass window panel may be received by a glide member, and the glide member may be disposed in the upper or lower track member to facilitate sliding of the movable glass window panel at least partially along the upper or lower track member.

100 Claims, 8 Drawing Sheets

U.S. PATENT DOCUMENTS

| | | |
|---|---|---|
| 3,332,169 A | 7/1967 | Lohr et al. |
| 3,333,362 A | 8/1967 | Kostin et al. |
| 3,342,246 A | 9/1967 | Reiss |
| 3,343,867 A | 9/1967 | Couch et al. |
| 3,376,670 A | 4/1968 | Jones |
| 3,384,997 A | 5/1968 | Heeter |
| 3,427,770 A | 2/1969 | Kunert et al. |
| 3,440,765 A | 4/1969 | Eskra et al. |
| 3,440,892 A | 4/1969 | Eskra |
| 3,448,486 A | 6/1969 | Wright |
| 3,468,738 A | 9/1969 | Deisenroth |
| 3,478,475 A | 11/1969 | Strack |
| 3,559,604 A | 2/1971 | Ruehleman et al. |
| 3,590,332 A | 6/1971 | Anderson et al. |
| 3,617,814 A | 11/1971 | Stanback |
| 3,628,828 A | 12/1971 | Page et al. |
| 3,631,630 A | 1/1972 | Buffington et al. |
| 3,635,100 A | 1/1972 | Littman |
| 3,636,671 A | 1/1972 | Hollister |
| 3,662,429 A | 5/1972 | Johnson et al. |
| 3,675,085 A | 7/1972 | Stanback |
| 3,678,625 A | 7/1972 | Vance |
| 3,678,626 A | 7/1972 | Heikel |
| 3,686,794 A | 8/1972 | Sakamoto et al. |
| 3,707,521 A | 12/1972 | De Santis |
| 3,713,578 A | 1/1973 | Johnson |
| 3,714,127 A | 1/1973 | Fabris et al. |
| 3,724,132 A | 4/1973 | Romberg |
| 3,737,355 A | 6/1973 | Epstein et al. |
| 3,740,897 A | 6/1973 | Johns |
| 3,759,004 A | 9/1973 | Kent |
| 3,768,207 A | 10/1973 | Mongelli et al. |
| 3,770,312 A | 11/1973 | Shadburn |
| 3,774,363 A | 11/1973 | Kent |
| 3,779,794 A | 12/1973 | De Santis |
| 3,784,243 A | 1/1974 | Pastva, Jr. |
| 3,791,072 A | 2/1974 | Miller |
| 3,791,074 A | 2/1974 | Waffenschmidt |
| 3,806,188 A | 4/1974 | Tantlinger |
| 3,808,742 A | 5/1974 | Ehret et al. |
| 3,819,560 A | 6/1974 | Kehr |
| 3,825,053 A | 7/1974 | Romberg |
| 3,827,184 A | 8/1974 | Pennec et al. |
| 3,835,585 A | 9/1974 | Anderson et al. |
| 3,837,984 A | 9/1974 | Wagner et al. |
| 3,867,790 A | 2/1975 | Frank |
| 3,874,118 A | 4/1975 | Robinson |
| 3,875,700 A | 4/1975 | Street |
| 3,881,303 A | 5/1975 | Krafka et al. |
| 3,885,072 A | 5/1975 | Zibritosky |
| 3,892,713 A | 7/1975 | Burkus et al. |
| 3,893,260 A | 7/1975 | Cadiou |
| 3,893,261 A | 7/1975 | Cribben |
| 3,900,965 A | 8/1975 | Mummert |
| 3,903,567 A | 9/1975 | Suska |
| 3,906,670 A | 9/1975 | Burton |
| 3,908,311 A | 9/1975 | Romberg |
| 3,916,055 A | 10/1975 | Wagner |
| 3,927,727 A | 12/1975 | Hanagan |
| 3,947,999 A | 4/1976 | Disperens |
| 3,962,827 A | 6/1976 | Chaffee |
| 3,967,424 A | 7/1976 | Gates |
| 3,974,753 A | 8/1976 | Blomgren et al. |
| 3,979,364 A | 9/1976 | Rowton |
| 3,990,196 A | 11/1976 | Eddins |
| 4,004,050 A | 1/1977 | Rabito et al. |
| 4,014,072 A | 3/1977 | Schumacher |
| 4,031,049 A | 6/1977 | Hirosawa et al. |
| 4,047,467 A | 9/1977 | Lundin |
| 4,067,605 A | 1/1978 | Green et al. |
| 4,072,340 A | 2/1978 | Morgan |
| 4,073,093 A | 2/1978 | Ookawa et al. |
| 4,081,926 A | 4/1978 | Jardin |
| 4,084,347 A | 4/1978 | Brown |
| 4,087,940 A | 5/1978 | Voegele, Jr. |
| 4,093,304 A | 6/1978 | Ziegler |
| 4,095,640 A | 6/1978 | Beckerer, Jr. |
| 4,097,442 A | 6/1978 | Kieft et al. |
| 4,098,024 A | 7/1978 | Naka |
| 4,098,025 A | 7/1978 | Stock et al. |
| 4,099,511 A | 7/1978 | McIntire et al. |
| 4,104,825 A | 8/1978 | Hosmer |
| 4,106,239 A | 8/1978 | Bancroft et al. |
| 4,110,268 A | 8/1978 | Longley et al. |
| 4,115,901 A | 9/1978 | Schmidt |
| 4,115,955 A | 9/1978 | Aldrich |
| 4,116,483 A | 9/1978 | Kramer et al. |
| 4,118,827 A | 10/1978 | Yamamoto |
| 4,118,894 A | 10/1978 | Kennedy et al. |
| 4,119,341 A | 10/1978 | Cook |
| 4,120,598 A | 10/1978 | Zernig et al. |
| 4,124,054 A | 11/1978 | Spretnjak |
| 4,124,954 A | 11/1978 | Redick |
| 4,126,965 A | 11/1978 | Hoffman |
| 4,127,968 A | 12/1978 | Trulaske |
| 4,130,966 A | 12/1978 | Kujawa, Jr. et al. |
| 4,132,033 A | 1/1979 | Esposito |
| 4,132,035 A | 1/1979 | Frambach |
| 4,137,669 A | 2/1979 | Nunlist |
| 4,139,234 A | 2/1979 | Morgan |
| 4,157,634 A | 6/1979 | Coulston |
| 4,158,270 A | 6/1979 | Cherbourg et al. |
| 4,167,088 A | 9/1979 | Governale |
| 4,167,259 A | 9/1979 | Bury |
| 4,169,731 A | 10/1979 | Noshiro et al. |
| 4,170,847 A | 10/1979 | Pickles |
| 4,171,594 A | 10/1979 | Colanzi |
| 4,175,357 A | 11/1979 | Goldhaber |
| 4,177,540 A | 12/1979 | Gorton |
| 4,180,644 A | 12/1979 | Marquis et al. |
| 4,186,460 A | 2/1980 | Artman |
| 4,186,524 A | 2/1980 | Pelchat |
| 4,200,328 A | 4/1980 | Morgan |
| 4,201,411 A | 5/1980 | Morgan |
| 4,208,755 A | 6/1980 | Shepherd |
| 4,216,051 A | 8/1980 | Brown et al. |
| 4,219,230 A | 8/1980 | Lapine |
| 4,223,482 A | 9/1980 | Barroero et al. |
| 4,226,052 A | 10/1980 | DeStepheno |
| 4,235,117 A | 11/1980 | Pickles |
| 4,243,262 A | 1/1981 | Tokunaga et al. |
| 4,248,489 A | 2/1981 | Barroero et al. |
| 4,255,901 A | 3/1981 | Stenberg |
| 4,263,749 A | 4/1981 | McDougle |
| 4,272,934 A | 6/1981 | Cowden et al. |
| 4,274,901 A | 6/1981 | Elber |
| 4,284,751 A | 8/1981 | Hutt et al. |
| 4,294,498 A | 10/1981 | Van Luit |
| 4,296,961 A | 10/1981 | Hunt et al. |
| 4,300,752 A | 11/1981 | Schultz |
| 4,314,721 A | 2/1982 | Clark |
| 4,317,312 A | 3/1982 | Heideman |
| 4,320,221 A | 3/1982 | Hoffman |
| 4,322,914 A | 4/1982 | McGaughey |
| 4,325,203 A | 4/1982 | Wicks |
| 4,328,643 A | 5/1982 | Bell |
| 4,345,607 A | 8/1982 | Contreras et al. |
| 4,350,803 A | 9/1982 | Penn |
| 4,358,011 A | 11/1982 | Buschbom et al. |
| 4,358,151 A | 11/1982 | Wood |
| 4,363,191 A | 12/1982 | Morgan |
| 4,364,214 A | 12/1982 | Morgan et al. |
| 4,364,595 A | 12/1982 | Morgan et al. |
| 4,371,204 A | 2/1983 | George et al. |
| 4,373,294 A | 2/1983 | Kennedy et al. |
| 4,387,923 A | 6/1983 | Choby et al. |
| 4,389,818 A | 6/1983 | Sakamoto |
| 4,391,065 A | 7/1983 | Rice |
| 4,391,653 A | 7/1983 | Takechi et al. |
| 4,392,330 A | 7/1983 | Buhr |
| 4,396,221 A | 8/1983 | Morgan et al. |
| 4,403,452 A | 9/1983 | Urbanick |
| 4,405,173 A | 9/1983 | Piano |
| 4,406,087 A | 9/1983 | Asaka et al. |
| 4,407,093 A | 10/1983 | Spretnjak et al. |
| 4,414,052 A | 11/1983 | Habata |
| 4,419,844 A | 12/1983 | Kreisfeld |

| | | | | | |
|---|---|---|---|---|---|
| 4,422,688 A | 12/1983 | Kameoka | 4,738,052 A | 4/1988 | Yoshida |
| 4,424,605 A | 1/1984 | Squires | 4,743,672 A | 5/1988 | Goel |
| 4,431,790 A | 2/1984 | Umeda et al. | 4,755,251 A | 7/1988 | Cline et al. |
| 4,433,866 A | 2/1984 | Hagiwara | 4,756,767 A | 7/1988 | Soni et al. |
| 4,433,930 A | 2/1984 | Cosenza | 4,761,916 A | 8/1988 | Sanok et al. |
| 4,438,609 A | 3/1984 | Neilson et al. | 4,762,904 A | 8/1988 | Nakama |
| 4,438,993 A | 3/1984 | Rabas | 4,775,570 A | 10/1988 | Ohlenforst et al. |
| 4,443,973 A | 4/1984 | Naka | 4,776,132 A | 10/1988 | Gold |
| 4,444,976 A | 4/1984 | Rabito | 4,777,699 A | 10/1988 | Hill et al. |
| 4,447,985 A | 5/1984 | Weber et al. | 4,778,702 A | 10/1988 | Hutter, III |
| 4,457,046 A | 7/1984 | Vater | 4,778,845 A | 10/1988 | Tschan et al. |
| 4,457,111 A | 7/1984 | Koike | 4,781,609 A | 11/1988 | Wilson et al. |
| 4,469,370 A | 9/1984 | Petersen | 4,785,499 A | 11/1988 | Giuffrida et al. |
| 4,478,005 A | 10/1984 | Mundschenk | 4,785,583 A | 11/1988 | Kawagoe et al. |
| 4,483,102 A | 11/1984 | Edwards | 4,793,098 A | 12/1988 | Wilkerson |
| 4,484,773 A | 11/1984 | Lehne | 4,793,099 A | 12/1988 | Friese et al. |
| 4,489,127 A | 12/1984 | Gutek et al. | 4,793,886 A | 12/1988 | Okamura et al. |
| 4,495,731 A | 1/1985 | Sears | 4,799,344 A | 1/1989 | Francis |
| 4,500,606 A | 2/1985 | Rabito et al. | 4,799,730 A | 1/1989 | Harasaki |
| 4,502,248 A | 3/1985 | Thomas, Jr. et al. | 4,809,425 A | 3/1989 | Monforte |
| 4,502,249 A | 3/1985 | Banford | 4,810,025 A | 3/1989 | Riley |
| 4,505,054 A | 3/1985 | Clark et al. | 4,811,532 A | 3/1989 | Fratti et al. |
| 4,511,129 A | 4/1985 | Kishino | 4,813,182 A | 3/1989 | Daniels et al. |
| 4,511,626 A | 4/1985 | Schumacher | 4,817,585 A | 4/1989 | Craver |
| 4,512,124 A | 4/1985 | Banford | 4,819,377 A | 4/1989 | Bauer et al. |
| 4,532,973 A | 8/1985 | DeFalco | 4,820,810 A | 4/1989 | Klein et al. |
| 4,534,587 A | 8/1985 | Fleming | 4,822,656 A | 4/1989 | Hutter, III |
| 4,538,379 A | 9/1985 | Vargo | 4,823,512 A | 4/1989 | Maekawa et al. |
| 4,539,345 A | 9/1985 | Hansen | 4,826,239 A | 5/1989 | Nishikawa et al. |
| 4,543,747 A | 10/1985 | Kaltz et al. | 4,828,315 A | 5/1989 | Muirhead |
| 4,543,755 A | 10/1985 | Crandell | 4,835,907 A | 6/1989 | Heuchert |
| 4,544,171 A | 10/1985 | Kellogg | 4,839,122 A | 6/1989 | Weaver |
| 4,545,522 A | 10/1985 | Kerzner | 4,841,698 A | 6/1989 | Gold |
| 4,553,360 A | 11/1985 | Colombo | 4,848,570 A | 7/1989 | Gosciniak |
| 4,555,867 A | 12/1985 | Stibolt | 4,850,142 A | 7/1989 | Sasamura et al. |
| 4,561,223 A | 12/1985 | Gold et al. | 4,858,988 A | 8/1989 | Morgan et al. |
| 4,562,668 A | 1/1986 | Karhu et al. | 4,861,540 A | 8/1989 | Nieboer et al. |
| 4,566,222 A | 1/1986 | Hatvany | 4,864,689 A | 9/1989 | Brockhaus |
| 4,569,553 A | 2/1986 | Speth | 4,876,132 A | 10/1989 | Kunert |
| 4,571,278 A | 2/1986 | Kunert | 4,876,952 A | 10/1989 | Kuno et al. |
| 4,572,872 A | 2/1986 | Yamazaki et al. | 4,878,314 A | 11/1989 | Blockinger |
| 4,573,287 A | 3/1986 | Hagemeyer et al. | 4,879,853 A | 11/1989 | Braendle et al. |
| 4,576,670 A | 3/1986 | Schade et al. | 4,881,773 A | 11/1989 | Ichinose |
| 4,582,738 A | 4/1986 | Kunert | 4,889,175 A | 12/1989 | Frey et al. |
| 4,591,204 A | 5/1986 | Gallitzendoerfer et al. | 4,894,972 A | 1/1990 | Endoh et al. |
| 4,600,254 A | 7/1986 | Whalen | 4,903,455 A | 2/1990 | Veazey |
| 4,606,159 A | 8/1986 | Kunert | 4,905,345 A | 3/1990 | Lunenschloss |
| 4,608,778 A | 9/1986 | Shiraishi et al. | 4,907,667 A | 3/1990 | Yamamoto et al. |
| 4,608,780 A | 9/1986 | Van Noy | 4,909,869 A | 3/1990 | Sakamoto et al. |
| 4,610,109 A | 9/1986 | Ruigrok | 4,910,071 A | 3/1990 | Kunert |
| 4,618,067 A | 10/1986 | Cohn et al. | 4,912,807 A | 4/1990 | Futch et al. |
| 4,618,176 A | 10/1986 | Farmont | 4,918,865 A | 4/1990 | Hirai |
| 4,621,469 A | 11/1986 | Kruschwitz | 4,918,866 A | 4/1990 | Pastva |
| 4,623,738 A | 11/1986 | Sugerman et al. | 4,920,698 A * | 5/1990 | Friese et al. ............ 49/380 |
| 4,625,459 A | 12/1986 | Warner | 4,922,660 A | 5/1990 | Omelchuk |
| 4,626,475 A | 12/1986 | Goel et al. | 4,923,232 A | 5/1990 | Kawagoe et al. |
| 4,629,265 A | 12/1986 | Chester | 4,923,756 A | 5/1990 | Chung et al. |
| 4,634,196 A | 1/1987 | Nestell | 4,925,237 A | 5/1990 | Bohm et al. |
| 4,635,398 A | 1/1987 | Nakamura | 4,927,207 A | 5/1990 | Kishino |
| 4,635,415 A | 1/1987 | Schumacher et al. | 4,933,032 A | 6/1990 | Kunert |
| 4,638,596 A | 1/1987 | Gallardo | 4,934,098 A | 6/1990 | Prouteau et al. |
| 4,643,794 A | 2/1987 | Saracsan et al. | 4,941,286 A | 7/1990 | Marscholl et al. |
| 4,648,636 A | 3/1987 | Reynard | 4,948,206 A | 8/1990 | Fitzpatrick |
| 4,651,382 A | 3/1987 | Krolick | 4,949,507 A | 8/1990 | Vaughan |
| 4,660,325 A | 4/1987 | Bauer et al. | 4,950,715 A | 8/1990 | Duck et al. |
| 4,668,008 A | 5/1987 | Stinson | 4,951,907 A | 8/1990 | Gold |
| 4,671,013 A | 6/1987 | Friese et al. | 4,954,199 A | 9/1990 | Rains et al. |
| 4,672,100 A | 6/1987 | Schönbächler et al. | 4,955,659 A | 9/1990 | Kosugi |
| 4,674,231 A | 6/1987 | Radek et al. | 4,956,954 A | 9/1990 | Horgan, Jr. |
| 4,684,167 A | 8/1987 | Newmayer | 4,962,615 A | 10/1990 | Birdling |
| 4,692,838 A | 9/1987 | Merchant | 4,963,220 A | 10/1990 | Bachmann et al. |
| 4,697,841 A | 10/1987 | Klein et al. | 4,963,636 A | 10/1990 | Mulhaupt et al. |
| 4,700,525 A | 10/1987 | Nieboer et al. | 4,970,911 A | 11/1990 | Ujihara et al. |
| 4,703,099 A | 10/1987 | Regelman | 4,979,264 A | 12/1990 | Ramsauer |
| 4,704,970 A | 11/1987 | Sanderson et al. | 4,985,535 A | 1/1991 | Takada et al. |
| 4,712,341 A | 12/1987 | Harris, Jr. et al. | 4,986,595 A | 1/1991 | Gold |
| 4,719,120 A | 1/1988 | Green et al. | 4,987,699 A | 1/1991 | Gold |
| 4,723,809 A | 2/1988 | Kida et al. | 4,994,315 A | 2/1991 | Schreiber et al. |
| 4,727,702 A | 3/1988 | Baker et al. | 4,994,540 A | 2/1991 | Boerner et al. |

| | | |
|---|---|---|
| 4,995,195 A | 2/1991 | Olberding et al. |
| 4,995,666 A | 2/1991 | Schurmann |
| 4,998,612 A | 3/1991 | Halsey et al. |
| 5,002,806 A | 3/1991 | Chung |
| 5,005,317 A | 4/1991 | Saint-Louis Augustin et al. |
| 5,007,201 A | 4/1991 | D'Hoore et al. |
| 5,008,311 A | 4/1991 | Janoski |
| 5,016,721 A | 5/1991 | Yamamoto et al. |
| 5,023,668 A | 6/1991 | Kluy et al. |
| 5,028,082 A | 7/1991 | Kronbetter |
| 5,035,025 A | 7/1991 | Morris |
| 5,035,082 A | 7/1991 | Butler |
| 5,035,084 A | 7/1991 | Towns |
| 5,042,855 A | 8/1991 | Bennett et al. |
| 5,042,871 A | 8/1991 | Gotanda et al. |
| 5,046,283 A | 9/1991 | Compeau et al. |
| 5,046,284 A | 9/1991 | Harper |
| 5,050,928 A | 9/1991 | Bohm et al. |
| 5,054,241 A | 10/1991 | Mishima et al. |
| 5,054,242 A | 10/1991 | Keys et al. |
| RE33,741 E | 11/1991 | Boissevain |
| 5,062,248 A | 11/1991 | Kunert |
| 5,063,638 A | 11/1991 | Howard et al. |
| 5,064,494 A | 11/1991 | Duck et al. |
| 5,069,512 A | 12/1991 | Sykes |
| 5,072,984 A | 12/1991 | Jackson |
| 5,076,637 A | 12/1991 | Larkin et al. |
| 5,082,736 A | 1/1992 | Bravet et al. |
| 5,085,021 A | 2/1992 | Kunert |
| 5,092,492 A | 3/1992 | Centea |
| 5,096,255 A | 3/1992 | Leischner |
| 5,099,611 A | 3/1992 | Kracht et al. |
| 5,112,877 A | 5/1992 | Barker et al. |
| 5,121,824 A | 6/1992 | Halsey et al. |
| 5,125,207 A | 6/1992 | Strobl, Jr. et al. |
| 5,125,716 A | 6/1992 | Smith et al. |
| 5,131,349 A | 7/1992 | Keller et al. |
| 5,136,812 A | 8/1992 | Voegele |
| 5,137,770 A | 8/1992 | Rothe et al. |
| 5,140,771 A | 8/1992 | Moy et al. |
| 5,143,996 A | 9/1992 | Chung et al. |
| 5,146,712 A | 9/1992 | Hlavaty |
| 5,147,927 A | 9/1992 | Baghdachi et al. |
| 5,150,943 A | 9/1992 | Gold |
| 5,154,028 A | 10/1992 | Hill et al. |
| 5,161,419 A | 11/1992 | Moy et al. |
| 5,170,586 A | 12/1992 | Ose et al. |
| 5,171,051 A | 12/1992 | Yada |
| 5,171,818 A | 12/1992 | Wilson |
| 5,185,402 A | 2/1993 | Fleming et al. |
| 5,187,837 A | 2/1993 | Gunderson et al. |
| 5,187,897 A | 2/1993 | Maidment |
| 5,193,308 A | 3/1993 | Davidian |
| 5,199,218 A | 4/1993 | McQuade |
| 5,201,822 A | 4/1993 | Chen |
| 5,205,072 A | 4/1993 | Eutebach |
| 5,206,331 A | 4/1993 | Tsuno et al. |
| 5,207,036 A | 5/1993 | Sampson et al. |
| 5,212,907 A | 5/1993 | Van Sandt |
| 5,214,877 A | 6/1993 | Kaspar et al. |
| 5,214,878 A | 6/1993 | Watt |
| 5,215,349 A | 6/1993 | Horton |
| 5,217,786 A | 6/1993 | Keys |
| 5,227,409 A | 7/1993 | Mobley et al. |
| 5,228,740 A | 7/1993 | Saltzman |
| 5,231,948 A | 8/1993 | Malmanger et al. |
| 5,232,532 A | 8/1993 | Hori |
| 5,236,650 A | 8/1993 | Choby et al. |
| 5,238,264 A | 8/1993 | Barnes |
| 5,239,406 A | 8/1993 | Lynam |
| 5,242,518 A | 9/1993 | Riederer |
| 5,245,788 A | 9/1993 | Riegelman |
| 5,261,721 A | 11/1993 | Conger et al. |
| 5,263,280 A | 11/1993 | Dilcher |
| 5,274,881 A | 1/1994 | DeRosa |
| 5,279,882 A | 1/1994 | Daude et al. |
| 5,291,710 A | 3/1994 | Golen |
| 5,294,168 A | 3/1994 | Kronbetter |
| 5,299,616 A | 4/1994 | Sholtz |
| 5,302,333 A | 4/1994 | Capriotti et al. |
| 5,304,623 A | 4/1994 | Ito et al. |
| 5,310,796 A | 5/1994 | Warren et al. |
| 5,327,682 A | 7/1994 | Holtz |
| 5,333,411 A | 8/1994 | Tschirschwitz et al. |
| 5,338,767 A | 8/1994 | Sartelet et al. |
| 5,342,867 A | 8/1994 | Ryan et al. |
| 5,342,873 A | 8/1994 | Merz et al. |
| 5,345,717 A | 9/1994 | Mori et al. |
| 5,349,040 A | 9/1994 | Trinks et al. |
| 5,355,625 A | 10/1994 | Matsuoka |
| 5,355,627 A | 10/1994 | Katz |
| 5,363,596 A | 11/1994 | Kronbetter |
| 5,367,036 A | 11/1994 | Saito et al. |
| 5,368,378 A | 11/1994 | Curtis |
| 5,385,061 A | 1/1995 | Moy et al. |
| 5,385,383 A | 1/1995 | Kreis et al. |
| 5,388,372 A | 2/1995 | Zanoni |
| 5,388,424 A | 2/1995 | Chopko et al. |
| 5,392,565 A | 2/1995 | Rentschler |
| 5,394,649 A | 3/1995 | Lindgren et al. |
| 5,398,449 A | 3/1995 | Kobrehel et al. |
| 5,401,453 A | 3/1995 | Moretz et al. |
| 5,413,317 A | 5/1995 | Spoerre |
| 5,413,397 A | 5/1995 | Gold |
| 5,419,085 A | 5/1995 | Imbur |
| 5,421,124 A | 6/1995 | Zuccaro |
| 5,426,897 A | 6/1995 | Gazaway |
| 5,428,925 A | 7/1995 | Snyder |
| 5,428,968 A | 7/1995 | Tetsukawa et al. |
| 5,430,982 A | 7/1995 | Bane |
| 5,442,880 A | 8/1995 | Gipson |
| 5,443,673 A | 8/1995 | Fisher et al. |
| 5,451,090 A | 9/1995 | Brodie et al. |
| 5,457,913 A | 10/1995 | Gold |
| 5,459,185 A | 10/1995 | Nakata et al. |
| 5,467,560 A | 11/1995 | Camp et al. |
| 5,473,840 A | 12/1995 | Gillen et al. |
| 5,473,842 A | 12/1995 | Hillery |
| 5,475,956 A | 12/1995 | Agrawal et al. |
| 5,476,626 A | 12/1995 | Miyama et al. |
| 5,483,771 A | 1/1996 | Herbst |
| 5,492,951 A | 2/1996 | Beyrle et al. |
| 5,505,023 A | 4/1996 | Gillen et al. |
| 5,508,111 A | 4/1996 | Schmucker |
| 5,522,191 A | 6/1996 | Wenner et al. |
| 5,523,877 A | 6/1996 | Lynam |
| 5,529,655 A | 6/1996 | Bravet et al. |
| 5,531,046 A | 7/1996 | Kollar et al. |
| 5,537,782 A | 7/1996 | Klippert et al. |
| 5,542,214 A | 8/1996 | Buening |
| 5,544,458 A | 8/1996 | Fisher et al. |
| 5,548,056 A | 8/1996 | Chung |
| 5,551,193 A | 9/1996 | Barnett |
| 5,551,197 A | 9/1996 | Repp et al. |
| 5,567,530 A | 10/1996 | Drujon et al. |
| 5,591,528 A | 1/1997 | Fisher et al. |
| 5,595,025 A | 1/1997 | MacPhail-Fausey |
| 5,611,180 A | 3/1997 | Agrawal et al. |
| 5,613,322 A | 3/1997 | Kobrehel |
| 5,613,323 A | 3/1997 | Buening |
| 5,613,325 A | 3/1997 | Mariel |
| 5,617,675 A | 4/1997 | Kobrehel |
| 5,618,080 A | 4/1997 | Sullivan |
| 5,623,785 A | 4/1997 | Mariel |
| 5,631,318 A | 5/1997 | Ito et al. |
| 5,647,094 A | 7/1997 | Mariel |
| 5,657,580 A | 8/1997 | Kobrehel |
| 5,669,181 A | 9/1997 | Kollar et al. |
| 5,671,501 A | 9/1997 | Laramie |
| 5,680,245 A | 10/1997 | Lynam |
| 5,680,728 A | 10/1997 | Moy |
| 5,704,173 A | 1/1998 | Repp et al. |
| 5,707,473 A | 1/1998 | Agrawal et al. |
| 5,711,112 A | 1/1998 | Barten et al. |
| 5,723,205 A | 3/1998 | Millette et al. |
| 5,724,769 A | 3/1998 | Cripe et al. |
| 5,724,771 A | 3/1998 | Gipson |
| 5,735,089 A | 4/1998 | Smith et al. |

| | | | |
|---|---|---|---|
| 5,743,959 A | 4/1998 | Ash et al. |
| 5,744,557 A | 4/1998 | McCormick et al. |
| 5,747,581 A | 5/1998 | Proebster et al. |
| 5,749,174 A | 5/1998 | Mariel |
| 5,763,011 A | 6/1998 | Miyama et al. |
| 5,775,029 A | 7/1998 | Buening |
| 5,784,832 A | 7/1998 | LeeVan |
| 5,784,833 A | 7/1998 | Sponable et al. |
| 5,787,643 A | 8/1998 | Schmuck |
| 5,799,444 A | 9/1998 | Freimark et al. |
| 5,799,449 A | 9/1998 | Lyons et al. |
| 5,804,018 A | 9/1998 | Fisher et al. |
| 5,809,706 A | 9/1998 | Neaux |
| 5,822,921 A | 10/1998 | Griepenstroh et al. |
| 5,822,922 A | 10/1998 | Grumm et al. |
| 5,832,667 A | 11/1998 | Buening et al. |
| 5,836,110 A | 11/1998 | Buening |
| 5,839,231 A | 11/1998 | Gebhart et al. |
| 5,853,895 A | 12/1998 | Lewno |
| 5,864,419 A | 1/1999 | Lynam |
| 5,864,987 A | 2/1999 | Mariel et al. |
| 5,864,996 A | 2/1999 | Veldman et al. |
| 5,887,393 A | 3/1999 | Vanark et al. |
| 5,896,704 A | 4/1999 | Neag |
| 5,915,780 A | 6/1999 | Kobrehel et al. |
| 5,916,600 A | 6/1999 | Dubay et al. |
| 5,934,022 A | 8/1999 | Faubert |
| 5,941,022 A | 8/1999 | Schmuck |
| 5,966,874 A | 10/1999 | Repp et al. |
| 5,986,797 A | 11/1999 | Lynam |
| 5,996,284 A | 12/1999 | Freimark et al. |
| 6,000,814 A | 12/1999 | Nestell et al. |
| 6,014,840 A | 1/2000 | Ray et al. |
| 6,018,913 A | 2/2000 | Lin |
| 6,021,605 A | 2/2000 | Laux et al. |
| 6,026,611 A | 2/2000 | Ralston et al. |
| 6,032,990 A | 3/2000 | Stone et al. |
| 6,038,819 A | 3/2000 | Klein |
| 6,039,390 A | 3/2000 | Agrawal et al. |
| 6,054,001 A | 4/2000 | Swanson et al. |
| 6,068,719 A | 5/2000 | Lewno |
| 6,086,138 A | 7/2000 | Xu et al. |
| 6,089,646 A | 7/2000 | Xu et al. |
| 6,112,462 A | 9/2000 | Kolar |
| 6,119,401 A | 9/2000 | Lin et al. |
| 6,119,402 A | 9/2000 | Wisner |
| 6,120,274 A | 9/2000 | Gerig et al. |
| 6,122,093 A | 9/2000 | Lynam |
| 6,123,383 A | 9/2000 | Doerflinger et al. |
| 6,125,585 A | 10/2000 | Koneval et al. |
| 6,128,860 A | 10/2000 | Repp et al. |
| 6,141,910 A | 11/2000 | Kobrehel et al. |
| 6,158,173 A | 12/2000 | Goodrich |
| 6,178,697 B1 | 1/2001 | Goodrich |
| 6,203,639 B1 | 3/2001 | Swanson et al. |
| 6,223,470 B1 | 5/2001 | Millard et al. |
| 6,286,261 B1 | 9/2001 | Hackstock |
| 6,286,890 B1 | 9/2001 | Faubert |
| 6,286,891 B1 | 9/2001 | Gage et al. |
| 6,293,609 B1 | 9/2001 | Xu et al. |
| 6,298,606 B1 | 10/2001 | Repp et al. |
| 6,319,344 B1 | 11/2001 | Lewno |
| 6,324,727 B1 | 12/2001 | Ortoleva |
| 6,324,788 B1 | 12/2001 | Koneval et al. |
| 6,398,396 B1 | 6/2002 | Nestell et al. |
| 6,434,789 B1 | 8/2002 | Kruse |
| 6,454,449 B2 | 9/2002 | Nestell et al. |
| 6,521,083 B1 | 2/2003 | Swanson et al. |
| 6,547,880 B1 | 4/2003 | Krueger et al. |
| 6,591,552 B1 | 7/2003 | Rasmussen |
| 6,599,386 B2 | 7/2003 | Swanson et al. |
| 6,669,267 B1 | 12/2003 | Lynam et al. |
| 6,688,659 B2 | 2/2004 | Kobrehel |
| 6,691,464 B2 | 2/2004 | Nestell et al. |
| 6,748,638 B2 | 6/2004 | Dedrich et al. |
| 6,819,467 B2 | 11/2004 | Lynam |
| 6,846,039 B2 | 1/2005 | Lewno |
| 6,871,450 B2 | 3/2005 | Repp et al. |
| 6,926,949 B1 | 8/2005 | Halg et al. |
| 6,969,101 B2 | 11/2005 | Lynam et al. |
| 7,003,916 B2 | 2/2006 | Nestell et al. |
| 7,073,293 B2 | 7/2006 | Galer |
| 7,234,756 B2 | 6/2007 | Lynam et al. |
| 7,332,225 B2 | 2/2008 | Lewno |
| 7,360,338 B2 | 4/2008 | Repp et al. |
| 7,588,652 B2 | 9/2009 | Repp et al. |
| 7,712,809 B2 | 5/2010 | Lynam et al. |
| 2003/0070371 A1 | 4/2003 | Kobrehel |
| 2003/0110703 A1 | 6/2003 | Kobrehel |
| 2003/0213179 A1 | 11/2003 | Galer |
| 2004/0020131 A1 | 2/2004 | Galer et al. |
| 2005/0121942 A1 | 6/2005 | Repp et al. |
| 2005/0188622 A1 | 9/2005 | Nestell |
| 2006/0107600 A1 | 5/2006 | Nestell et al. |
| 2008/0156415 A1 | 7/2008 | Repp et al. |
| 2008/0196816 A1 | 8/2008 | Lewno |
| 2009/0293368 A1 | 12/2009 | Repp et al. |

FOREIGN PATENT DOCUMENTS

| | | |
|---|---|---|
| DE | 1902498 | 8/1970 |
| DE | 2039313 | 5/1971 |
| DE | 7520034 U | 11/1975 |
| DE | 2840811 | 4/1980 |
| DE | 3044614 | 7/1982 |
| DE | 3118559 | 11/1982 |
| DE | 3246396 | 12/1982 |
| DE | 3409903 A1 | 10/1984 |
| DE | 3404693 | 9/1985 |
| DE | 3419893 A1 | 11/1985 |
| DE | 3501490 A1 | 7/1986 |
| DE | 3509531 | 12/1986 |
| DE | 3624621 | 4/1987 |
| DE | 3643472 A1 | 12/1987 |
| DE | 3727413 | 2/1988 |
| DE | 3641363 | 6/1988 |
| DE | 3832178 A1 | 4/1990 |
| DE | 3925804 | 8/1990 |
| DE | 4002514 A1 | 8/1990 |
| DE | 4113816 | 11/1991 |
| DE | 4129492 | 1/1993 |
| EP | 0037097 | 3/1981 |
| EP | 0037097 | 10/1981 |
| EP | 0096128 A1 | 12/1983 |
| EP | 0096129 A1 | 12/1983 |
| EP | 0109659 A2 | 5/1984 |
| EP | 0128086 A2 | 12/1984 |
| EP | 0219903 A1 | 4/1987 |
| EP | 289156 | 11/1988 |
| EP | 0298788 | 1/1989 |
| EP | 0307316 A2 | 3/1989 |
| EP | 0345134 A2 | 12/1989 |
| EP | 0352151 | 1/1990 |
| EP | 0368728 A2 | 5/1990 |
| EP | 0385924 | 9/1990 |
| EP | 0400291 A1 | 12/1990 |
| EP | 0418123 | 3/1991 |
| EP | 0449372 | 3/1991 |
| EP | 0449372 | 10/1991 |
| EP | 0488878 | 6/1992 |
| EP | 0494824 | 7/1992 |
| EP | 526327 | 2/1993 |
| EP | 0542673 A1 | 5/1993 |
| EP | 0576179 | 12/1993 |
| EP | 0576180 A1 | 12/1993 |
| EP | 650768 | 5/1995 |
| FR | 0709660 | 5/1931 |
| FR | 2552483 | 3/1985 |
| GB | 1215267 | 12/1970 |
| GB | 1235056 | 6/1971 |
| GB | 1452812 | 10/1976 |
| GB | 2001700 A | 2/1979 |
| GB | 1573354 | 8/1980 |
| GB | 2048356 A | 12/1980 |
| GB | 2174746 A | 11/1986 |
| GB | 2215717 A | 9/1989 |
| JP | 47-11057 | 4/1972 |
| JP | 46-95369 | 6/1972 |
| JP | 47-36332 | 11/1972 |

| | | |
|---|---|---|
| JP | 49-47624 | 5/1974 |
| JP | 58-47533 | 3/1983 |
| JP | 61-266337 | 11/1986 |
| JP | 62-278035 | 2/1987 |
| JP | 63060131 | 3/1988 |
| JP | 01219280 | 1/1989 |
| JP | S64-45520 U | 3/1989 |
| JP | 1122722 | 5/1989 |
| JP | 1219280 | 9/1989 |
| JP | H2258844 | 10/1990 |
| JP | 30-70626 | 3/1991 |
| JP | H370626 | 3/1991 |
| JP | 3236922 | 10/1991 |
| WO | WO 95/02621 | 1/1995 |

OTHER PUBLICATIONS

ADCO™ Products, Inc., "ADCO FC-1000™ Fast Curing Urethane Auto Glass Adhesive", 4 pages.
ADCO™ Products, Inc., Material Safety Data Sheet, "AD-380 Urethane Auto Glass Sealant", 6 pages.
ADCO™ Products, Inc., Material Safety Data Sheet, "FC-1000 Urethane Sealant", 5 pages.
Adhesives, D.A.T.A. Digest, 1991, 237 pages.
Anil B. Goel, New Hybrid Structural Adhesive for Reinforced Plastics, Feb. 2-6, 1987, 7 pages.
ASC, "The Evolution of Adhesives Used in Structural & Assembly Applications", 1 page, dated Sep. 2008.
Ashland Chemicals Pliogrip 6036 Wash Primer, Technical Data, Nov. 1986.
Ashland Chemical's Pliogrip 6600 Urethane Adhesive, Technical Data, Jul. 1986.
Ashland Chemicals Pliogrip 6620, Technical Data, Oct. 1986.
Ashland Chemicals, Pliogrip Adhesive Systems for Structural Bonding, 1986, 16 pages.
Ashland Pliogrip Adhesive Systems, 8200 Primer, Infotech Product Literature, 2000.
Ashland Speciality Chemical, "Pliogrip OEM Adhesive Applications", 8 pages, not dated.
B. Post, Technische Anforderungen an Sicherheitsglas und Verglasungswerkstoff im Rahmen nationaler und internationaler Gesetzgebung, date unknown, 6 pages.
Betamate™ Structural Adhesives, "Two Component Urethanes", 1 page.
Betaseal 43518 Clear Glass Primer Process Standard, Dow Automotive, Oct. 15, 1999.
BetaSeal 43520A Blackout Glass Primer Process Standard, Dow Automotive, Oct. 17, 2001.
Bonding and Coating Plastics in the Automotive Industry, EuroTrends, Nov. 1990.
Bonding with Epoxy Elastomeric Adhesives System, Glass to Metal Military Specification B-48612, Sep. 1, 1997.
Brian R. Suddaby, Michael J. Short, and Thomas N. Thompson, SAE Technical Paper Series, Improvements in RIM Encapsulated Windows, Feb. 26-Mar. 2, 1990, 8 pages.
Capri 2000 and Capri V-6, Sexy Europeans Imported for Lincoln-Mercury, Advertising Brochure, allegedly made public more than one year prior to the present application.
Capri One Success Story After Another, Advertising Brochure, allegedly made public more than one year prior to the present application.
Capri Sport Coupe, Excerpt from Advertising Brochure, allegedly made public more than one year prior to the present application.
Capri The Sexy European Imported by Lincoln-Mercury, LMC 70-111, Advertising Brochure, allegedly made public more than one year prior to the present application.
Charles E. Rogers, "Durability of Structural Adhesives," Adhesive Bonding Advance Technology/Update—Oct. 19-21, 1993, Univ. of Wis. Ctr for Cont. Ed., (51 pages).
Chrysler Adhesive-Sealer Polyurethane Base-Room Temperature Moisture Curing Glass to Body Opening Applications, MS-CD910, Change A, Jul. 1972, 4 pages.
Chrysler Adhesive-Sealer-Polyurethane Base-Room Temperature Curing Windshield and Backlight Applications, MS-CD917, Change A, Jun. 1990, 10 pages.

Chrysler Bonding of Windshield and Backlites to Body Opening With Adhesive/Sealer Polyurethane Base-Room Temperature Curing, PS-7103, Change E, Apr. 1993, 7 pages.
Chrysler Corporation Material Standard, Structural Adhesive- Steel to Tempered Glass, MSCD618<S> Change: D, May 8, 1997.
Chrysler Corporation Process Standard, Bonding of Steel Channel to Tempered Glass With a Structural Adhesive, No. PS-6764<S> Change: C, Jun. 3, 1997.
Chrysler Electrically Heated Backlight, PF-6071, Change C, Sep. 1981, 7 pages.
Chrysler Encapsulated Glass Assembly Using TPU Material, No. PF-, 3 pages, date unknown.
Chrysler Environmental, Health, and Occupational Safety Requirements for Regulated Substances or Processes and Vehicle Recycling Reporting Requirements, CS-9003, Change B, Apr. 1993, 17 pages.
Chrysler Glass Assembly Using Urethane Adhesive, No. PF-, Apr. 1993, 7 pages.
Chrysler Glass-Safety-Heat Treated, MS-3694, Change T, Jun. 1990, 13 pages.
Chrysler Microcellular Polyurethane-High Density, MS-AY549, Change C, 9 pages, date unknown.
Chrysler Modular Window Air and Water Leak Test, PS-8461, Feb. 1987, 3 pages.
Chrysler Performance of Injection Molded TPU to Single Side of Fritted Tempered Glass, Apr. 1993, 3 pages.
Chrysler Primer-Adhesion Promoter-Polyurethane Adhesive to Glass, MS-CF121, Change A, Jul. 1972, 4 pages.
Chrysler Primer-Blackout-Polyurethane to Glass-Windshield and Backlight Applications, MS-CF136, Change D, 7 pages, date unknown.
Chrysler Tolerance Control of Window Glass Parts and Glass-And-Frame Assemblies, PS-4468, Change B, Sep. 1981, 13 pages.
CSR #87-318, Project #IC 501, Book #1206, "Betamate Structural Adhesive Testing", 10 pages.
D. Weyher, Adhesives Used in Automotive Production, 710106, SAE, Jan. 11, 1971.
"Designer's Reference Guide to High-Performance Bonding Tapes for Product Design and Assembly," 3M-Industrial Specialties Division, St. Paul, Minnesota, 1991 (24 pages).
Double Coated Industrial Tapes Reference Guide, 3M Industrial Tape and Specialties Division, 70-0702-0266-1(104.5)R1, 1994.
Dow Automotive, "Betamate 73100/73002, 73005, 73010, 73015 Structural Adhesive", 2 pages, not dated.
Dow Automotive, "BETAMATE Structural Adhesives Bond Headliners to Roofs and Improve NVH Performance", 2 pages, not dated.
Dow Automotive, "BETASEAL Glass Bonding Systems Save Costs/Assembly Time and Improve Vehicle Structure", 2 pages, not dated.
Dow Automotive, "Solutions for Durability, Strength and Style. Plastic Bonding", 6 pages, not dated.
Dow Automotive, "Solutions that Perform—from Dow Automotive", 4 pages, not dated.
Dow Automotive, "Solutions. Systems. Success. Bus, Truck, Rail", 12 pages, not dated.
Dow Automotive, "Superior Strength, Performance and Safety. Direct Glazing/Glass Bonding", 6 pages, not dated.
Dow Automotive, "Surrounded by Strength and Style. Exteriors", 12 pages, not dated.
Dr. Jamil Baghdachi, "Fundamentals of Adhesive Bonding", date unknown (320 pages).
Dupont Rynite Thermoplastic Polyester Resin Product Information, Apr. 1, 1989.
E. Plueddemann, Bonding to Metals, AD90-125, SAE, Nov. 1989.
E. Sydor, Bonding of Structural Adhesives, National Automotive Week Paper, SAE, Mar. 1961.
Essex Specialty Products, Inc., "Betamate® Structural Adhesives Testing Procedures for Prepainted Metal", 22 pages.
Essex Specialty Products, Inc., Technical Bulletin "BETAMATE® 73100/73003 Structural Adhesive", 8 pages.
European Search Report of corresponding European patent application No. 94307205.8.
Exhibit A—Complaint and Jury Demand (Nov. 22, 2005).

Exhibit B—Guardian's Answer, Defenses, Affirmative Defenses and Counterclaims to Donnelly's Complaint and Jury Demand (May 18, 2006).
Exhibit C—Plaintiff's Reply to Defendant's Counterclaim (Jun. 9, 2006).
Exhibit D—First Amended Complaint (Feb. 23, 2007).
Exhibit E—Gaurdian's Answer, Defenses, Affirmative Defenses and Counterclaims to Donnelly's First Amended Complaint and Jury Demand (Apr. 2, 2007).
Exhibit F—Counter-Defendant's Reply to Defendant/Counter-Plaintiff's Counterclaims (Apr. 19, 2007).
Exhibit G—Complaint and Jury Demand (Oct. 17, 2006).
Exhibit H—Defendant Pilkington North America, Inc.'s Answer, Affirmative Defenses, Counterclaims and Jury Demand (Dec. 28, 2006).
Exhibit I—Plaintiff's Reply to Counterclaim of Defendant Pilkington North America, Inc. (Jan. 17, 2007).
Exhibit J—Complaint and Jury Demand (Feb. 19, 2008).
Exhibit K—First Amended Complaint and Jury Demand (Apr. 22, 2008).
Exhibit L—Pilkington North America, Inc.'s Answer, Affirmative Defenses, and Counterclaim to First Amended Complaint and Jury Demand (Jul. 29, 2008).
Exhibit M—Plaintiff's Answer to Counterclaim and Affirmative Defenses (Aug. 18, 2008).
Exhibit N—Complaint and Jury Demand (Feb. 19, 2008).
Exhibit O—Guardian's Answer, Defenses, Affirmative Defenses and Counterclaims to Donnelly's Complaint and Jury Demand (Jul. 30, 2008).
Exhibit P—Magna Donnelly's Answer and Affirmative Defenses to Guardian's Counterclaims (Aug. 19, 2008).
Exhibit Q—Extract of document No. 78-28 filed by the defendant in the Guardian Litigation with the U.S. District Court for the Eastern District of Michigan, Apr. 25, 2007.
Exhibit R—Pilkington's Prior Art Disclosure (Jan. 30, 2009).
Ford Engineering Material Specification, WSB-M11Pxx-A, 1 page, date unknown.
G. MacIver, The State of Polyurethane Structural Adhesive Technology in the Transporation Industry, 910386, SAE, Feb. 25, 1991.
G. Sauer, Innovationen auf dem Glassektor, 1988, 7 pages.
G. Schneberger, Automotive Adhesives-Past,Present and Future, 800210,SAE, Feb. 25, 1980.
G. Schneberger, Automotive Adhesives—Why, How, What, Where, 780191, SAE, Feb. 27, 1978.
G. Teicher, Prüfung von Fahrzeugscheiben und Entwicklung neuer Prüfverfahren, date unknown, 9 pages.
GM Adhesion and Durability of Bonded Weaterstrip-Pressure Sensitive Adhesive, GM9795P, Mar. 1990, 3 pages.
GM Adhesion and Durability of Exterior Trims, GM9758P, Nov. 1988, 3 pages.
GM Adhesive, Two-Part, Epoxy, FRP, 9985600, May 1994, 3 pages.
GM Adhesive, Two-Part, Epoxy, Hardener, 9985601, May 1994, 2 pages.
GM Adhesive, Two-Part, Epoxy, Resin, 9985602, May 1994, 1 page.
GM Adhesive, Two-Part, Polyurethane, Structural 9985786, Apr. 1992, 2 pages.
GM Adhesive, Two-Part, Polyurethane, Structural 9985787, Apr. 1992, 1 page.
GM Adhesive, Two-Part, Polyurethane, Structural 9985788, Apr. 1992, 2 pages.
GM Adhesive, Twopart, Urethane, FRP, 9985454, Jun. 1992, 3 pages.
GM Cleavage Peel Test, GM9797P, Nov. 1988, 3 pages.
GM Electrodeposition Primer-Cathodic ELPO for Small Parts, 9984120, 1993, 1 page.
GM Knife Quick Adhesion Test for Stationary Glass Bonding Materials to Paint, GM9522P, Jan. 1992, 1 page.
GM Molding and Emblem Adhesion Test Pluck Resistance, GM9774P, Jan. 1994, 4 pages.
GM Mounting Tape-Exterior Trim, GM3802M, Nov. 1993, 3 pages.
GM Performance of Substrates and/or Coatings Through Environmental Cycling, GM9505P, Jul. 1988, 4 pages.
GM Stationary Glass Bonding Adhesive System Performance Requirements, GM3652M, Jun. 1992, 2 pages.

GM Zinc Coated Steel Sheet and Strip, Hot Dip Galvanized, GM6185M, Aug. 1993, 2 pages.
Gurit Essex AG Beta Seal Betamate document, Jun. 1988, 136 pages.
H. Kunert and G. Cornils, Advanced Concepts for Modular Glazings, 920201, SAE, Feb. 24, 1992.
H. Kunert, Glasherstellung im Wandel der Technik, date unknown, 5 pages.
H.W. Coover, D.W. Dreifus and J.T. O'Connor, Loctite Corporation, "Cyanoacrylate Adhesives," Handbook of Adhesives, pp. 463-477, date unknown.
Hackh, Ingo W.D., 1890-1938, Grant & Hackh's Chemical Dictionary, Rev. ed. of Chemical Dictionary $4^{th}$ edition.
Henderson, Steve, ASI, "Innovations in Glass Bonding: urethane glass bonding adhesives from Dow Automotive can be dispensed robotically using industry standard equipment. (Dow Automotive Material Div.)", 2 pages, dated Mar. 1, 2005.
"How to Bond Plastics—The Better Way to Hold Parts Together," Loctite Corporation, Newington, Connecticut, Nov. 1988 (8 pages).
"How to Bond Plastics," Loctite Corporation, North America Group, Newington, Connecticut, Oct. 1992 (36 pages).
I. Houston, K. Dowing and K. Mack, General Motors—The Glue Line—Why How and When, SAE, Mar. 13, 1961.
I. Johns, Adhesion Fundamentals, Industrial Adhesives and Sealants Seminar, Australasia Technical Papers, Lecture No. 1, SAE, Dec. 1979.
I. Skeist and J. Miron, Introduction to Adhesives, Skeist Incorporated, allegedly made public more than one year prior to the present application.
J. Cocoo, L. Moffa, D. Callanan, The Role of Design for Manufacturing and Adhesives in Solving Design Challenges, 910504, SAE. Feb. 25, 1991.
J. Dunne, Inside Detroit—GM's 1990 FWD Minivan, Popular Mechanics, May 1987.
J. Shields, Adhesives Handbook, Third Edition, Butterworth & Co., 1985.
John M. Rooney and Bernard M. Malofsky, Loctite Corporation "Anaerobic Adhesives," Handbook of Adhesives, pp. 451-462, date unknown.
Journal of Elastomers and Plastics, 4 pages, dated 1988.
K. Habeeb, The Present and Future Uses of Reactive Type Adhesive, 700071, SAE, Jan. 12, 1970.
K. Schroeder and K. Drain, New Developments in Structural Adhesives, AD90-127,SAE, Nov. 1989.
K.H. Bruck, Fahrzeug-Verglasung, 1990, 8 pages.
Kurt Devries, Analysis of Adhesive Tensile Test Methods, Polymer Engineering & Science, Jul. 1986, vol. 26, No. 13, pp. 962-968.
L. Kertesz, Hopeful: GM Tarrytown Workers Approve Part in Bid to Win Production of Minivan, Automotive News, Crain Communications, Inc. Jan. 19, 1987.
"Loctite Technology—A Catalog of Adhesive and Sealant Solutions," Loctite Corporation Industrial Group, Newington, Connecticut, Sep. 1990 (62 pages).
Lord Product Catalog, "Lord Engineered Adhesives, Structural Adhesive Solutions for Virtually and Bonding Application", 14 pages, not dated.
M. Hermann and M. Rieder, Complete Systems for 1-Part, 2-Part Adhesive Technologies including the Pretreatment of Glass and Vehicle Bodies, and English translation, date unknown, 27 pages.
M. Kimball, Reactive Hot Melt Adhesives for Automotive Bonding, AD90-126, SAE, Nov. 1989.
Mark Blitshteyn, "Surface Treatment of Plastics: Review of Surface Treatment Technologies," University of Wisconsin, date unknown (38 pages).
Material Safety Data Sheet Betamate (R) 43518 Glass Primer, Essex Specialty Products, Inc., Aug. 2, 1993.
Material Safety Data Sheet for 435.18 adhesion promoter, dated Mar. 15, 2007, 11 pages.
Material Safety Data Sheet for 435.20 primer, dated Aug. 14, 1985, 2 pages.
Material Safety Data Sheet for 435,20A primer, dated Jan. 30, 2006, 12 pages.
Material Safety Data Sheet for 73002 polyol component, dated Jun. 24, 1994, 4 pages.

Material Safety Data Sheet for 73002 polyol component, dated Sep. 13, 2005, 8 pages.
Material Safety Data Sheet for 73003 polyol component, dated Mar. 24, 2004, 8 pages.
Material Safety Data Sheet for 73005 polyol component, dated Feb. 25, 2003, 7 pages.
Material Safety Data Sheet for 73005 polyol component, dated Jun. 7, 1996, 6 pages.
Material Safety Data Sheet for 73005 polyol component, dated Mar. 24, 2004, 8 pages.
Material Safety Data Sheet for 73010 polyol component, dated Mar. 23, 2004, 8 pages.
Material Safety Data Sheet for 73015 polyol component, dated Mar. 24, 2004, 8 pages.
Material Safety Data Sheet for 73100 isocyanate component, dated Sep. 13, 2005, 9 pages.
Michael R. Lapinski and Stuart R. Kerr, III, "Industrial Applications of Silicone Adhesives and Sealants," GE Silicones, date unknown.
Pau Rohrer and Robert Zilkens, Betamate (English Translation only), date unknown, 9 pages.
Photographs A-G of General Motors G300 Station wagon quarter window with hinged vent on sale or used by others more than one (1) year prior to Sep. 30, 1993.
Photographs of Chrysler AS minivan side window hinge on sale or used by others more than one (1) year prior to Sep. 30, 1993.
Photographs of side vent window allegedly from 1987 or 88 General Motors "CK" truck on sale or used by others more than one (1) year prior to Sep. 30, 1993.
Photographs of side vent window, origin unknown, allegedly on sale or used by others more than one (1) year prior to Sep. 30, 1993.
Photos provided by Pilkington allegedly showing a 1978 Corvette T-top; a 1990 GM 325 truck r/q swing-out; a 1990 F car T-top; and a 1991 GM 330 truck liftgate.
Pilkington Classics, "Windshields", 5 pages, not dated.
R. Agrawal, A. Agrawal and J. Thomas, Developments in Modular Windows for Automotive Applications, 910759,SAE, Feb. 25, 1991.
R. H. Beck and D.A. Yurek, Automotive Structural Bonding, 750077, SAE, Feb. 24, 1975.
R. Murray and L. Marlin, The Present and Future Status of Hot Melt Adhesives in the Automotive Industry, 700070, SAE, Jan. 12, 1970.
"Replacing Mechanical Fasteners for Advanced Product Assembly . . . Very-High-Bond Scott™ VHB™ Tapes," 3M—Industrial Tape and Specialties Division, St. Paul, MN, 1993 (8 pages).

Robert D. Anderson, "PSA Technology and Applications Adhesive Bonding Advanced Technology—Update 1993" 3M—Industrial Tape and Specialties Division, 1993 (17 pages).
S. Driller, Verglasungssysteme Gummiverglasung bis Flash-Glazing, date unknown, 13 pages.
S. Härdl, Anforderungen der Automobilindustrie an die Glashersteller-von der Projektdefinition bis zur Serle, date unknown, 11 pages.
S.J. Monte et al., Application of Titanate Coupling Agents in Mineral and Glass Fiber Filled Rim Urethane Systems, Journal of Elastomers and Plastics (Feb. 1982).
S.J. Monte et al., The Use of Titanate Coupling Agents in Urethanes, Journal of Cellular Plastics, (Mar./Apr. 1983).
SAE Technical Paper 900519, Feb. 26, 1990.
SAE Technical Paper 910758, Feb. 25, 1991.
Scotch-Weld Adhesive 642/6 mil, AutomotiveTechnical Data Sheet, 3M Automotive Systems Division, Jun. 20, 1987.
Skeist Ph.D., Irving, Handbook of Adhesives, Consultant to the Polymer Industries, Skeist Inc., (1990).
Structural bonding with polyurethane adhesives in high volume vehicle assemblies, date unknown, 2 pages.
Toyota One-Component Urethane Adhesives for Glass Sub-Assembly Parts, TSK5515G, Jun. 1991, 21 pages.
Toyota Polyvinyl Chloride Materials for Stainless Steel Molding, TSM7607G, Oct. 1990, 18 pages.
Toyota Technical Instruction Sheet No. 01 204-01033, Apr. 21, 1992, 11 pages.
Trans Sport Pontiac's Space Vehicle for the 90's, Advertising Brochure allegedly made public more than one year prior to the present application.
Tyrite 7500 Urethane Adhesive System, DS10-3603B, Lord Industrial Adhesives Product Information, 1984.
Valox Resin, Engineering Thermoplatic Properties Guide Product Information, GE Plastics Group allegedly made public more than one year prior to the present application.
Vista Suggested Processing Conditions for Vista Flexible PVC Compounds, 1992, 4 pages.
W.A. Pletcher, Bonding of Automotive Plastics—Technology and Applications, 810767, SAE, Jun. 8, 1981.

* cited by examiner

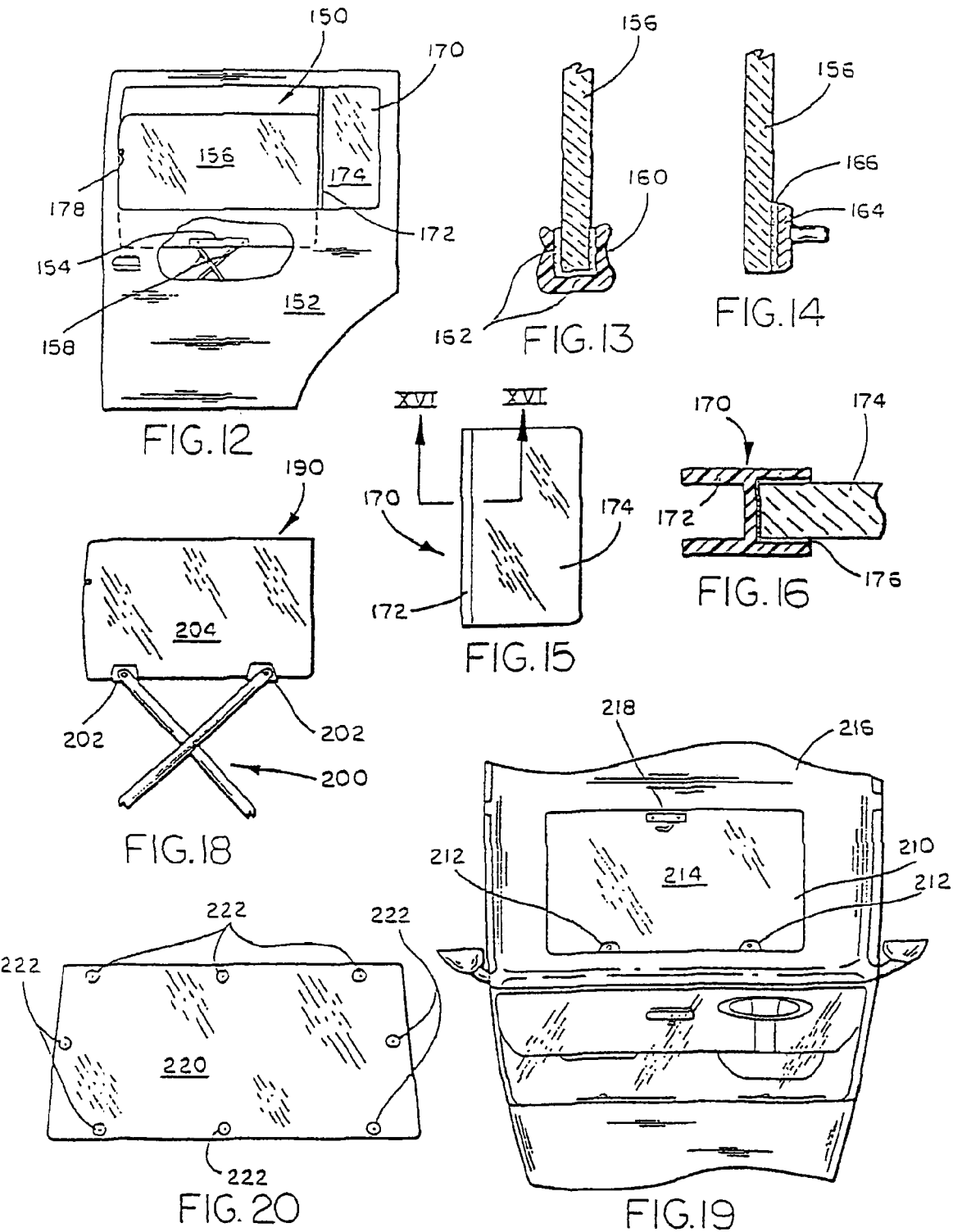

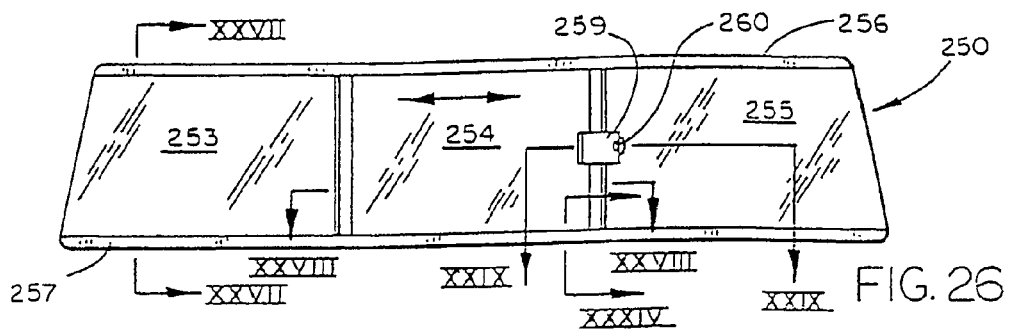
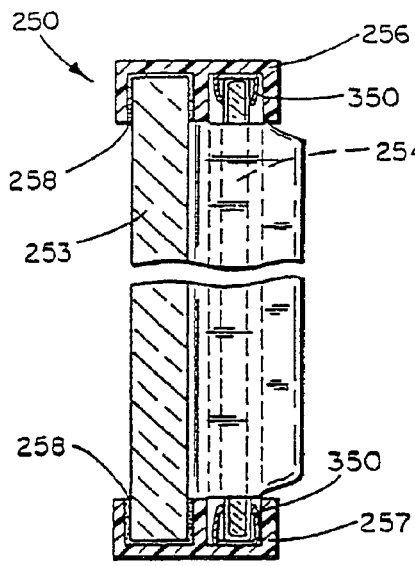 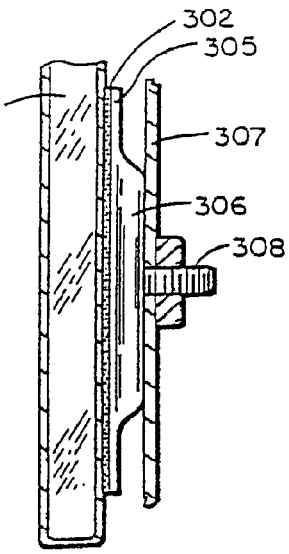 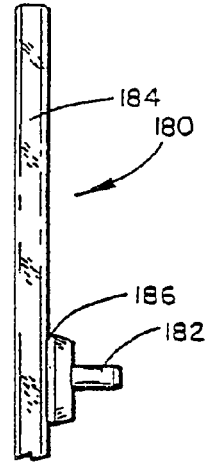
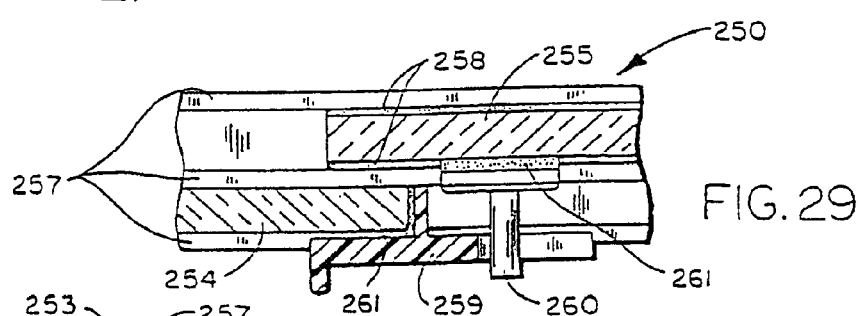
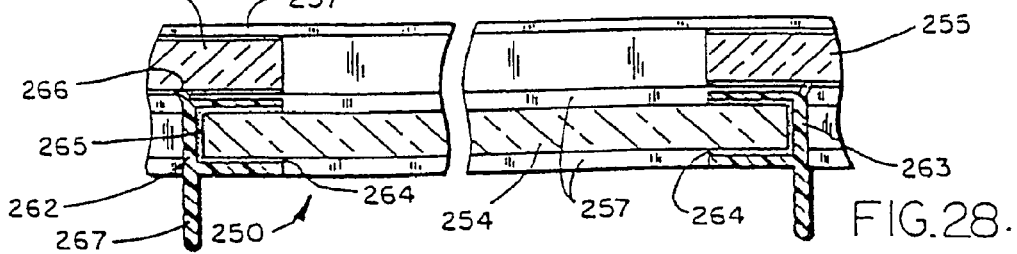

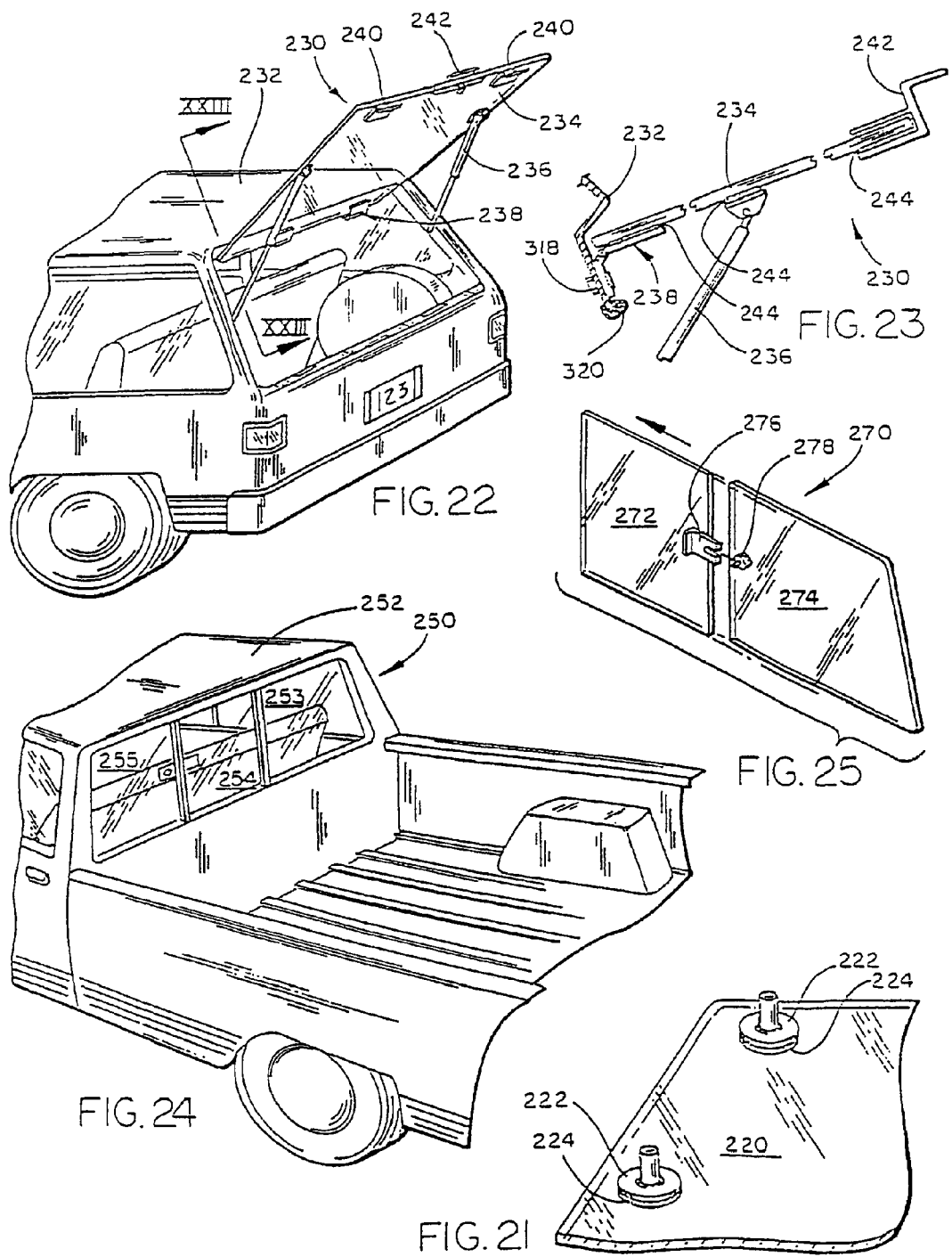

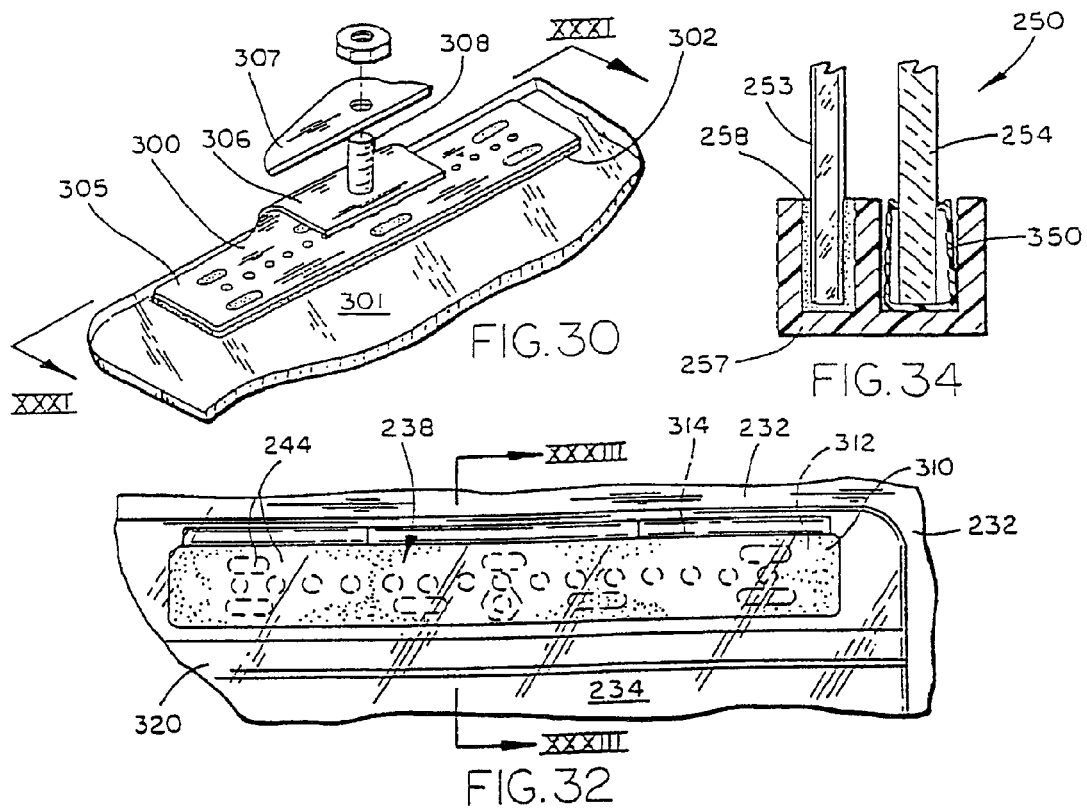
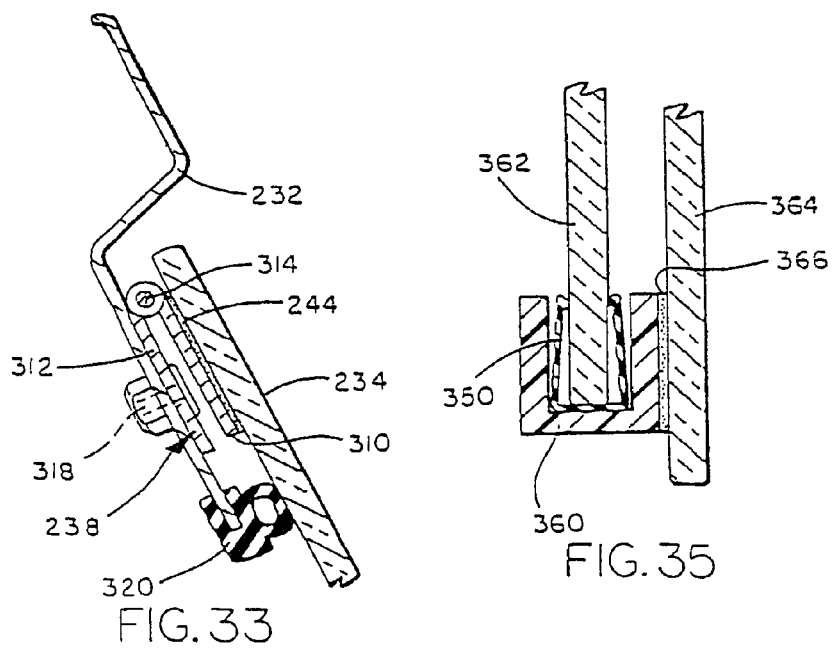

VEHICULAR REAR SLIDING WINDOW ASSEMBLY

CROSS REFERENCE TO RELATED APPLICATIONS

The present application is a continuation of U.S. patent application Ser. No. 11/969,561, filed Jan. 4, 2008, now U.S. Pat. No. 7,838,115, which is a continuation of U.S. patent application Ser. No. 10/847,088, filed May 17, 2004, now U.S. Pat. No. 7,332,225, which is a continuation of U.S. patent application Ser. No. 10/054,016, filed Nov. 13, 2001, now U.S. Pat. No. 6,846,039, which is a continuation of U.S. patent application Ser. No. 09/520,582, filed Mar. 8, 2000, now U.S. Pat. No. 6,319,344, which is a continuation of U.S. patent application Ser. No. 09/213,706, filed Dec. 17, 1998, now U.S. Pat. No. 6,068,719, which is a continuation of U.S. patent application Ser. No. 08/924,405, filed Aug. 22, 1997, now U.S. Pat. No. 5,853,895, which is a continuation of U.S. patent application Ser. No. 08/420,233, filed Apr. 11, 1995, abandoned, the disclosures of which are hereby incorporated by reference herein.

FIELD OF THE INVENTION

The present invention relates to bonded vehicular, assemblies comprising glass and other materials that utilize a two-component urethane adhesive to bond dynamic load-bearing attachment members to a panel surface to form a joint suitable for use in a vehicle. In addition, the present invention provides methods of bonding vehicular glass assemblies utilizing the class of adhesives described herein.

BACKGROUND OF THE INVENTION

Vehicular glass assemblies, particularly large movable van windows, often have one or more components such as hinges or devises affixed to the glass panel. When such assemblies are installed in vehicles, the assembly components and affixment means are often subjected to highly localized loads including dynamic loads, resulting from road vibration and opening and closing of the glass assembly. Therefore, original equipment manufacturer (OEM) specifications, utilized by most automotive companies to ensure that components supplied are suitable for use in vehicles, have required that components affixed to vehicular glass be able to withstand relatively high loads and severe vibration. At present, the primary method by which to attach such components that meets OEM specifications is by mechanical affixment of the component, e.g., hinge or clevis, to the glass panel. Typically, such mechanical affixment requires forming one or more holes through the glass panel, inserting component fasteners, and then mechanically attaching the components to the glass via the fasteners. In some applications involving wrap-around hinges, the formation of holes is avoided by positioning the hinge over a portion of the outer edge of the glass panel and clamping the hinge to the panel by use by one or more fasteners.

Neither of these approaches is entirely satisfactory in that each is relatively expensive due to the significant amount of time and labor involved in drilling holes and inserting or clamping fasteners, notwithstanding the cost of the additional fasteners or clamps. Moreover, mechanical affixment of components to glass necessitates the use of a mounting member or fastener on the opposite side of the glass from which the component is residing. This is undesirable in terms of both cosmetic appeal and resulting aerodynamics if the mounting member or fastener projects from the exterior surface of the glass panel, particularly as automotive designers strive to improve vehicle aesthetics and aerodynamics such as is useful, for example, in flush glazing of vehicles.

Single component urethane adhesives have been used as a window fixing adhesive to bond glass panels to an automobile body and for mounting glass mounting members. Such adhesives have also been used to attach studs, mirror mounting buttons, and the like to automotive glazing. As known to those skilled in the art, a single component urethane adhesive utilizes a highly prepolymerized isocyanate-rich urethane (typically formed from reacting an isocyanate with a polyol) typically mixed with an isocyanate (usually a polymeric isocyanate). The adhesive initially "sets" and finally "cures" when exposed to moisture in the air which causes the isocyanate moieties to cross-link with the urethane prepolymer(s) via a urea cross-linking reaction. The process usually requires several hours for the adhesive to sec and several days for a complete cure to be effected. Such long set and cure periods present challenges when used in high production race processes, such as automobile module assembly, because curing of the system typically requires temporary or permanent fixturing of the glass or mounting member(s), thus adding cost and extraneous equipment to the manufacturing process. Curing of single component urethanes may also require the use of humidity chambers, and in certain cases, the addition of heat to accelerate bonding which further adds cost, time, inventory, handling, and complexity to the manufacturing process.

Additionally, single-component urethanes, when employed as a window fixing adhesive, limit the range of applications of the resulting vehicular glass assembly. Such bonded assemblies are typically utilized so that only a relatively low load or stress occurs in the adhesive material or at the bond between the glass and the adhesive. Cured, single component urethanes often cannot withstand highly localized loads or high stresses, particularly at extreme environmental conditions such as high temperatures, exposure to moisture, and vibration.

In another respect, single-component urethanes are not entirely satisfactory for forming bonded glass assemblies, since single-component urethanes may induce stresses on the glass upon curing. Such stress increases the likelihood of glass fracture upon application of additional external forces or other stresses thereby rendering such adhesives unsatisfactory for forming joints in dynamic load-bearing applications in a vehicle.

Two-component urethane adhesive systems have been used for bonding fixed vehicle windows, such as windshields, for certain after-market applications. The term "two-component system" refers to urethane adhesive systems in which the isocyanate and polyol components are kept separate from one another until just prior to bonding at which time those components are mixed together and applied on the appropriate surfaces for bonding. Upon mixing the two components, a full urethane polymerization reaction occurs. The problems encountered with two-component systems currently recommended for after-market applications are that such systems are still relatively slow, typically requiring about 1 hour to set and about 3 days to cure, and result in a relatively weak initial bond that does not reach full cure properties for days.

At present, the automotive industry lacks a method for securely attaching load-bearing components, and particularly dynamic load-bearing components, to glass window panels that meets OEM requirements, is aesthetically appealing, is economical, and which avoids the numerous drawbacks of utilizing mechanical attachment methods. Prior art suggestions and attempts have not resulted in any commercially successful two-component urethane adhesive that is suitable for bonding hardware components to glass panels for use in vehicles, particularly for bonding hinges, devises, and similar attachments typically utilized in large area movable windows, such as those found in automobiles, minivans, sport utility vehicles, trucks, and buses.

SUMMARY OF THE INVENTION

In the present invention, a vehicular window assembly suitable for use in a vehicle is provided comprising a glass panel, an attachment member, and a layer of a rapid set, rapid cure, two-component urethane adhesive. In another embodiment, the present invention provides a vehicular panel assembly also suitable for use in a vehicle, the assembly comprising a glass substrate, an attachment member, and a layer of a two-component urethane adhesive including an isocyanate component and a polyol component that form a joint suitable for use on a vehicle. The present invention also provides a moveable window assembly comprising a glass panel, an attachment member, and a layer of a rapid set, rapid cure, two-component urethane adhesive disposed between the panel and attachment member. In yet another embodiment, the present invention provides a window, assembly comprising a glass panel, an attachment member, and a layer of adhesive disposed between the panel and the attachment member, in which the adhesive is capable, upon curing, to form a bond that can withstand a tensile force of at least 5 lbs/in$^2$. The present invention also provides a hinged vehicular window assembly comprising a glass panel and a hinged mounting member that is bonded to the glass panel by the rapid set, rapid cure I two-component urethane adhesive. The present invention further provides a movable window assembly comprising a glass panel and an attachment member bonded to the glass panel by an adhesive comprising an isocyanate component and a polyol component. Moreover, the present invention provides a positionable sunroof a movable door lift window assembly, a liftgate window assembly, and a sliding window assembly all utilizing the adhesives described herein.

The invention also provides a method of adhering an attachment member to a glass surface comprising, in part, depositing the rapid set, rapid cure, two-component urethane adhesive between the attachment member and glass surface and allowing the adhesive to cure. In another embodiment, a method is provided to adhere an attachment member to a glass substrate having a frit layer formed on the glass substrate, by use of the rapid set, rapid cure, two-component urethane adhesive.

The previously described assemblies meet or exceed OEM requirements and can withstand highly localized loads when installed and subjected to typical use in a vehicle.

BRIEF DESCRIPTION OF THE DRAWINGS

FIG. 12 is an elevational view of a vehicular side door illustrating a movable vehicular glass assembly, lift mechanism, and a fixed vent window assembly;

FIG. 13 is a cross-sectional view of a first embodiment of a lift bracket bonded to a glass panel by a layer of the preferred embodiment adhesive;

FIG. 14 is a cross-sectional view of a second embodiment of a lift bracket bonded to a glass panel by a layer of the preferred embodiment adhesive;

FIG. 15 is an elevational view of the fixed window assembly depicted in FIG. 12 comprising a rail bonded to a side of a glass panel by the preferred embodiment adhesive;

FIG. 16 is a cross section of the assembly depicted in FIG. 15 taken at line XVI-XVI;

FIG. 17 is a side view of a vehicular glass assembly comprising a guide pin bonded to a glass panel by a layer of the preferred embodiment adhesive;

FIG. 18 is an elevational view of an alternate embodiment for a movable vehicular glass assembly and lift mechanism comprising a plurality of lift brackets bonded to a glass panel by the preferred embodiment adhesive;

FIG. 19 is a plan view of a vehicle having a sunroof that comprises various components bonded to a glass panel by the preferred embodiment adhesive;

FIG. 20 is an elevational view of a glass panel suitable for fixed mounting to a vehicle, wherein the panel has a plurality of mounting components bonded to one of its surfaces by the preferred embodiment adhesive;

FIG. 21 is a perspective view of a portion of the panel depicted in FIG. 20, illustrating in greater detail one or more mounting components bonded to the glass surface;

FIG. 22 is a perspective view of a liftgate assembly installed in a vehicle and comprising a plurality of components bonded to a glass panel by the preferred embodiment adhesive;

FIG. 23 is a partial cross-sectional view of the liftgate assembly depicted in FIG. 22, illustrating in greater detail the bonding of components to the glass panel;

FIG. 24 is a perspective view of a sliding window assembly in a vehicle;

FIG. 25 is a perspective view of an alternate embodiment of a sliding window assembly comprising latch components bonded to glass panels by the preferred embodiment adhesive;

FIG. 26 is an elevational view of the sliding window assembly depicted in FIG. 24 illustrating guide tracks bonded to the upper and lower regions of a glass panel and a closure fixture bonded to a glass panel by the preferred embodiment adhesive;

FIG. 27 is a partial cross-section taken along line XXVII-XXVII in FIG. 26, illustrating in greater detail the configuration of the multiple panel sliding window assembly;

FIG. 28 is a partial cross section taken along line XXVIII-XXVIII in FIG. 26, illustrating additional aspects of the configuration of the multiple panel sliding window assembly;

FIG. 29 is a partial cross section taken along line XXIX-XXIX in FIG. 26, illustrating further aspects of the multiple panel sliding window assembly;

FIG. 30 is an exploded, perspective view of a hinge component bonded to a glass panel by a layer of the preferred embodiment adhesive;

FIG. 31 is an end view taken along line XXXI-XXXI of the assembly illustrated in FIG. 30;

FIG. 32 is an elevational view of the hinge component bonded to the glass panel of the liftgate assembly depicted in FIG. 22;

FIG. 33 is partial cross-sectional view of the hinged connection between the liftgate assembly and the vehicle depicted in FIG. 22;

FIG. 34 is a detail of the track of the sliding window assembly illustrated in FIG. 27; and FIG. 35 is a view of an alternate sliding window assembly, detailing a single channel track.

DESCRIPTION OF THE PREFERRED EMBODIMENTS

Figure 1:
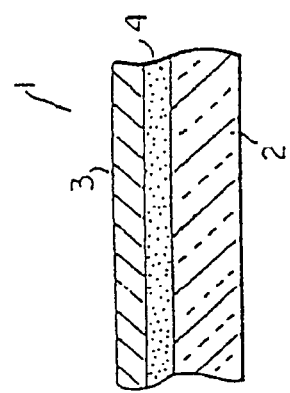
FIG. 1 is a cross section of a vehicular window assembly comprising a layer of glass bonded to another material by a layer of a preferred embodiment adhesive described herein.

A preferred embodiment of one aspect of the present invention for bonded glass assemblies is an automobile glass panel having a layer of a rapid set, rapid cure, two-component urethane disposed on the glass panel. Layers of such adhesives and others, described herein have remarkable characteristics upon curing that enable them to be used as joints on automobiles. FIG. 1 illustrates a cross section of a vehicular window assembly 1 comprising a glass substrate 2 and an attachment member 3 bonded thereto by a layer 4 of the rapid set, rapid cure, two-component urethane adhesive disposed between the glass, substrate and the attachment member or portions thereof.

In many of the preferred embodiments described herein, the two-component urethane adhesives utilized are "rapid set," and "rapid cure." Rapid set refers to a property exhibited by the two-component system, such that after mixing the components and relatively promptly contacting the adhesive mixture with the objects to be bonded together, the objects are held by the adhesive against movement resulting from their own weight or movement resulting from application of a relatively slight force, within about 3 minutes or less, preferably within about 90 seconds or less, and most preferably within about 45 seconds or less from the time of mixing and application of the adhesive to the objects.

The term "rapid cure" refers to a cure time of less than about 60 minutes preferably less than about 50 minutes, and most preferably less than about 40 minutes. That is, at least about 80%, preferably at least about 90%, and most preferably at least about 95% of the physical characteristics of the cured adhesives are obtained within about 60 minutes from the time of achieving the set phase of the adhesive. These two-component urethanes described herein fully cure, or substantially so, within the time periods referred to for rapid cure. That is, the average molecular weight of the polyurethane chains and degree of cross-linking in the adhesive matrix does not significantly change after the period of rapid cure.

The rapid set, rapid cure, two-component adhesives described in greater detail herein will find numerous applications in high production rate manufacturing processes, thereby often eliminating the requirement of fixturing bonded components and otherwise hindering the manufacturing process. These adhesives will withstand relatively high tensile, torque, or shear loads, extreme vibration even under high temperatures and after extended aging and thermal cycling, and resistance to adverse environmental conditions encountered by vehicular window assemblies. The rapid set, rapid cure, two-component urethanes described herein are able to withstand tensile and shear forces of at least 500 psi, preferably 700 psi, and most preferably 800 psi, without separation from the underlying glass, surface or breakage of the glass substrate. These adhesives described in greater detail herein, have been found to be useful for forming bonded assemblies comprising glass and dynamic load-bearing attachment members having low surface area mounting footprints, that are able to withstand relatively high loads or other stresses, significantly beyond the ability of conventional single-component urethanes. Such low surface area mounting footprints arc preferably less than about 6 in$^2$ and in some instances, may be less than about 1 in$^2$. In addition, it has surprisingly been discovered that these adhesives do not impart deleterious amounts of stress to the glass substrate to which they are bonded.

Frequent reference is made herein to bonding "attachment members" to glass. The term "attachment member" as used herein refers to any part, accessory, or constituent thereof, to be bonded to glass. In the context of vehicular window assemblies, reference to attachment members includes, but is not limited to, mounting components, hinges, devises, latches, lift brackets, division bars, guide tracks, handles, guide pins, strut-mounting hardware, strikers, brake lights, power-mounting hardware, rails, gaskets, antennas, wiper mounts, cosmetic articles, and particularly to dynamic load-bearing components having a relatively low surface area mounting footprint. In addition, reference to attachment members includes, but is not limited to, interior accessories such as rearview mirrors, mounting fixtures, and other components suitable for use in automobile passenger compartments.

Figure 2:
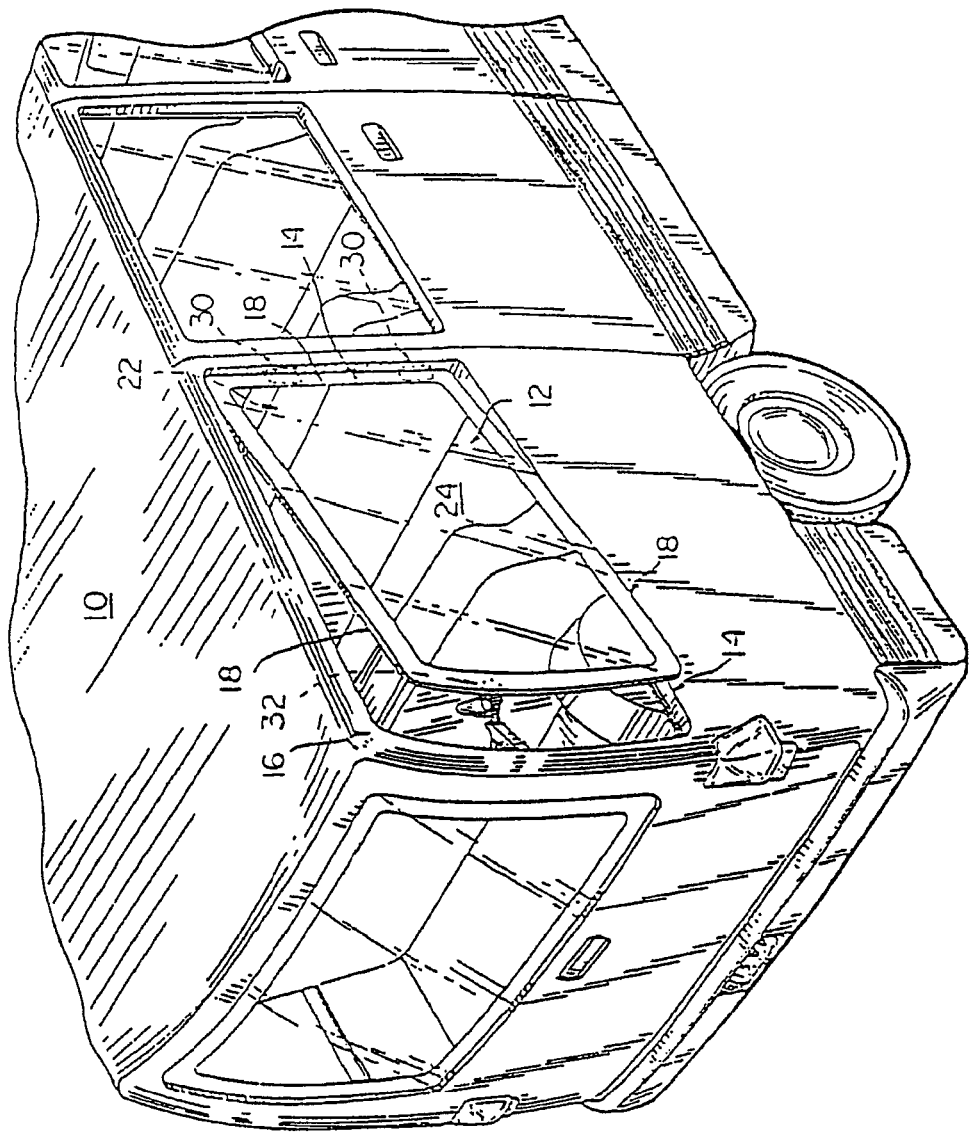
FIG. 2 is a perspective view of a preferred embodiment movable vehicular window assembly mounted as a side window in a vehicle.

The preferred embodiment bonded assemblies of glass and attachment member(s), include an automobile glass panel that is bonded by an effective amount of a preferred embodiment adhesive described herein to a mounting component, for example a metal component, affixed to a surface of an automobile body. FIG. 2 illustrates a preferred embodiment movable window or panel assembly 12 disposed in a vehicle 10 within a window opening 14 formed in the vehicle exterior 16. Window assembly 12 comprises a panel 24 that is preferably transparent glass, and one or more mounting members 30 and 32, bonded to panel 24 by the preferred embodiment adhesive, i.e., the rapid set, rapid cure, two-component urethane adhesive described herein. Window assembly 12 is adapted to articulate or pivot about a pair of mounting members 30 positioned approximate to peripheral edge 18 of inside surface 22 of panel 24. Panel assembly 12 is opened or closed about mounting members 30 by a second mounting member 32 interconnecting the vehicle 10 to panel assembly 12. Although panel assembly 12 is shown pivoting about an axis proximate to the leading peripheral edge 18, it is contemplated that various panels such as a rear window or tailgate window may be configured to articulate about a horizontal axis as well.

Figure 3:
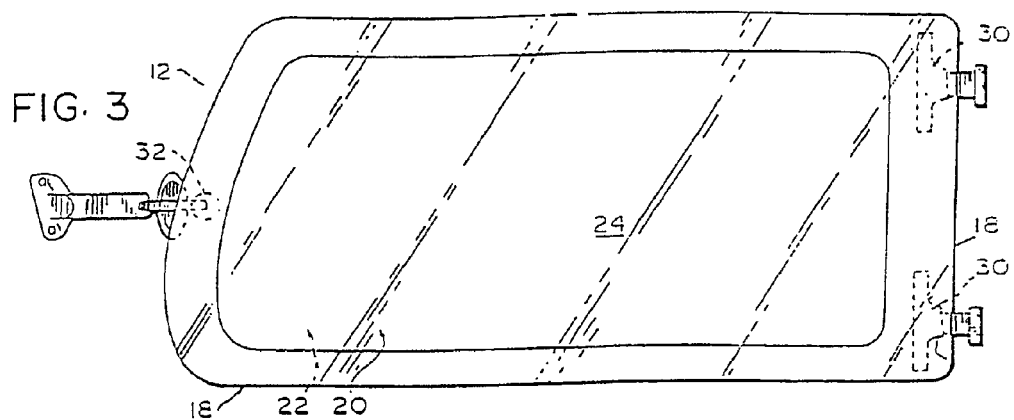
FIG. 3 is a side elevational view of an exterior surface of the vehicular window assembly depicted in FIG. 2.
Figure 4:
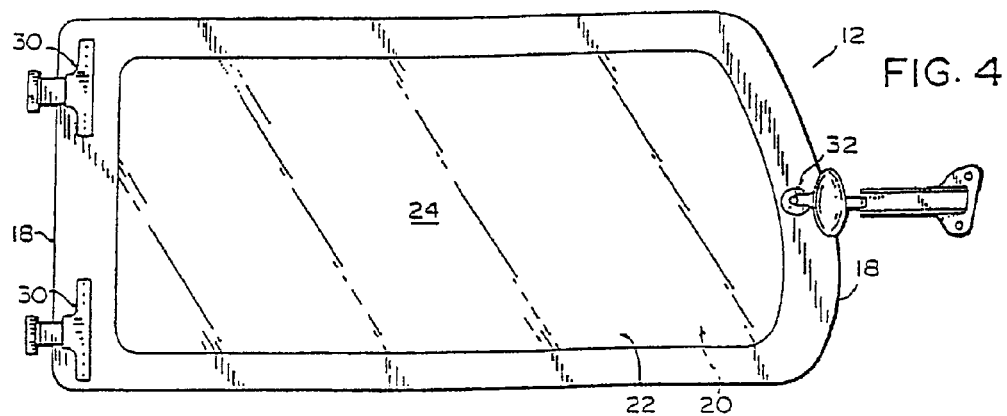
FIG. 4 is a side elevational view of the opposite, inner surface of the vehicular window assembly shown in FIG. 3.

FIGS. 3 and 4 illustrate in greater detail window assembly 12. Panel 24 is preferably transparent glass which is typically tempered I but may be laminated, or otherwise strengthened using conventional techniques and principles. Panel 24 may be curved, bent or generally planar, having two substantially parallel sides, surfaces, or faces 20, 22 terminating in a peripheral edge 18. Although transparent glass is preferred, other sheet-like panel materials may also be used such as opaque or coated glass, privacy glass, glass with a layer of ceramic fit, tinted glass, solar tinted glass, transparent, coated or opaque plastic materials, or multi-composite laminates, such as transparent glass and plastic. Additional details and variations of vehicular window assemblies are described in a copending application to the same assignee as the present application, Ser. No. 08/129,671, filed Sep. 30, 1993, now U.S. Pat. No. 5,551,197, issued Sep. 3, 1996, which is herein incorporated by reference.

Figure 5:
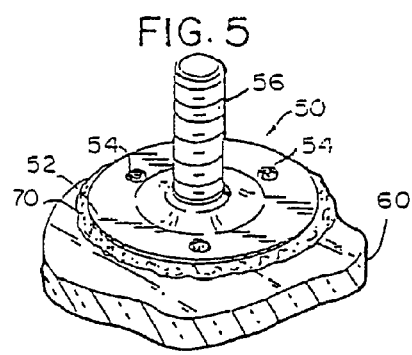
FIG. 5 is a perspective view of a mounting component bonded to a glass panel by a layer of a preferred embodiment adhesive.
Figure 6:
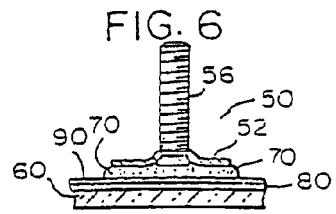
FIG. 6 is a cross section of the assembly depicted in FIG. 5.

FIGS. 5 and 6 illustrate mounting component 50 bonded to a glass substrate, 60 by a layer of rapid set, rapid cure, two-component urethane adhesive 70 as provided by the present invention. Component 50 is typical of a mounting component for attachment to glass 15 substrate 60, and comprises a base portion 52 having one or more optional apertures 54, and a threaded member 56 for engagement with another component or the vehicle. This bonded assembly, when utilized in a vehicular window application, will likely be subjected to highly localized loads and thus high stresses will be imparted to the adhesive. Accordingly, it is recommended to utilize the rapid set rapid cure, two-component adhesive due to its surprisingly high strength and ability to not impart deleterious amounts of stress on the underlying glass substrate. A layer of adhesion promoter and/or primer may be utilized to further improve and promote the bonding characteristics of the resulting assembly, as described in greater detail herein. FIGS. 5 and 6 illustrate such an embodiment comprising adhesion promoter layer 80 and primer layer 90.

Figure 7:
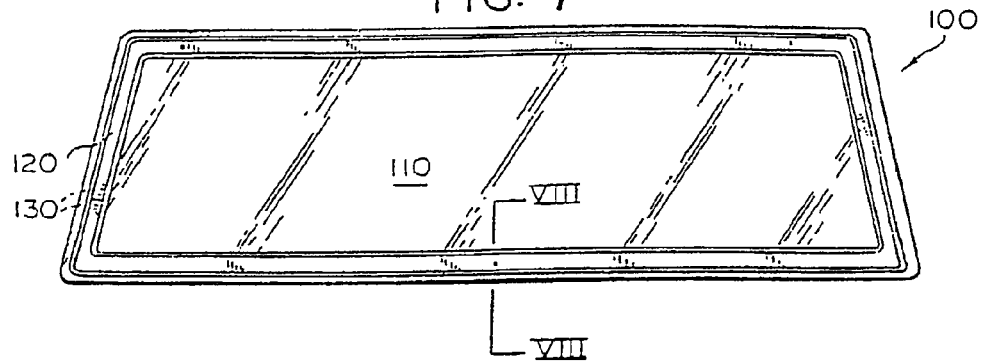
FIG. 7 is an elevational view of a window panel having a perimeter gasket bonded to glass substrate by the preferred embodiment adhesive.
Figure 8:
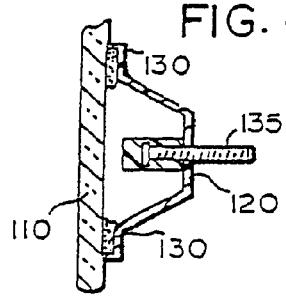
FIG. 8 is a cross section of the window depicted in FIG. 7 taken at line VIII-VIII.

The preferred embodiment adhesives described herein may be utilized to bond gaskets to glass panels for fixed mounting applications. FIG. 7 is an elevational view of a vehicular window assembly 100 comprising a glass panel 110 having a gasket 120 disposed along its perimeter. Gasket 120 is bonded to panel 110 by a layer 130 of the preferred embodiment rapid set, rapid cure, two-component urethane adhesive. Glass panel 110 may be any glass type or similar panel as previously described. Gasket 120 is typically a rigid polymeric material however a flexible polymeric material could also be used. An example of a suitable rigid material for a perimeter gasket is polyethylene terephthalate. FIG. 8 illustrates a cross section of a portion of assembly 100 taken at line VIII-VIII in FIG. 7. FIG. 8 illustrates a typical configuration of a window gasket bonded to a glass panel. Gasket 120 may contain one or more fasteners 135 projecting outward from the glass panel for subsequent attachment to a vehicle mounting surface or to another member.

The bonded assemblies described herein are particularly well suited for use as movable vehicular window assemblies. Such assemblies may find application as hinged window assemblies, sunroofs, door lift window assemblies, liftgates and sliding window assemblies. The assemblies may be utilized as movable windows in which one or more glass panel(s), preferably with one or more mounting or hinge-like components, are positionable with respect to a vehicular mounting surface. In many of these embodiments, a rust portion of a positionable member, e.g., hinge or hinged assembly, is bonded to a glass panel by an effective amount of the adhesives described herein. Another portion of the member is affixed or connected to a vehicular mounting surface or other intermediate surface. These various embodiments are described in greater detail as follows.

FIG. 12 illustrates a movable vehicular glass assembly 150 utilized as a vertically positionable door lift window in a vehicle side door 152. Assembly 150 comprises a lift bracket 154 bonded to a lower portion of a glass panel 156 by a layer of the preferred embodiment adhesive. As will be appreciated by those skilled in the art, lift bracket 154 is operably connected to one or more lifting members 158 of the window lift mechanism (not shown). FIGS. 13 and 14 are cross sections of two possible embodiments of lift brackets that can be bonded to glass in accordance, with the present invention. FIG. 13 illustrates a lift bracket 160 that supports glass panel 156 on a plurality of sides, and which preferably is bonded to panel 156 on each of those sides by a layer 162 of the preferred embodiment adhesive. FIG. 14 illustrates another embodiment of a lift bracket 164 bonded to glass panel 156 by a layer 166 of the preferred embodiment adhesive.

FIG. 12 further illustrates a fixed vent window assembly 170 installed in side door 152. Assembly 170 comprises a division bar 172 bonded to an exposed edge of glass panel 174, preferably adjacent movable glass panel 156. FIGS. 15 and 16 illustrate in greater detail fixed vent window assembly 170 comprising division bar or rail 172 bonded to an edge of glass panel 174 by a layer 176 of the preferred embodiment adhesive. FIG. 12 further illustrates a guide pin 178 bonded to glass panel 156 by the preferred embodiment adhesive. FIG. 17 illustrates a typical vehicular glass assembly 180 comprising an alternate embodiment guide pin 182 bonded to a surface of a glass panel 184 by a layer 186 of the preferred embodiment adhesive.

FIG. 18 illustrates alternate embodiment of a movable vehicular glass assembly 190 and lift mechanism 200. Assembly 190 comprises a plurality of lift brackets 202 bonded to a portion of a glass panel 204 by an effective amount of the preferred embodiment adhesive. Lift mechanism 200 is preferably engaged with panel 204 at each lift bracket 202.

FIG. 19 illustrates another embodiment of a movable window assembly in accordance with the present invention. Movable sunroof assembly 210 comprises one or more mounting components 212, which typically are hinges, bonded to a glass panel 214 by the preferred embodiment adhesive, and affixed to vehicle 216, as similarly described with respect to hinges 30 of assembly 12 depicted in FIGS. 2-4. Sunroof assembly 210 may further comprise a latch member 218 for locking the window closed, or maintaining panel 214 in a particular position when the sunroof is open.

As previously described, the present invention also encompasses fixed window assemblies that are affixed to or otherwise secured to one or more vehicle mounting surfaces. The preferred embodiment adhesives are well suited for bonding mounting components to glass for such fixed mounting application. FIGS. 20 and 21 illustrate a glass. panel 220 suitable for fixed mounting to a vehicle, wherein the panel has a plurality of mounting components 222 bonded to one or more surfaces of panel 220 by a layer 224 of the preferred embodiment adhesive.

FIGS. 22 and 23 illustrate a liftgate assembly 230 installed in a vehicle 232. Liftgate assembly 230 comprises a glass panel 234 having a plurality of components bonded to it such as struts 236, hinges 238, latches 240, and a handle 242. An effective amount or layer 244 of the preferred adhesive as described in greater detail herein is utilized to bond components 236, 238, 240, and 242 to glass panel 234. FIGS. 32 and 33 illustrate in greater detail the portion of liftgate assembly 230 having hinge 238 bonded to panel 234 and secured to vehicle 232 depicted in FIGS. 22 and 23. Hinge 238 comprises a mounting member 310 hingedly coupled to a base member 312 via a pin 314. Glass panel 234 is bonded to hinge mounting member 310 by a layer 244 of the preferred embodiment adhesive. Hinge base member 312 may be affixed to vehicle 232 in a variety of fashions, such as by one or more threaded fasteners 318. As will be appreciated by those skilled in the art, it may be desirable to utilize a gasket 320 disposed around the perimeter of the vehicle opening over which the panel or liftgate covers.

FIG. 24 illustrates a preferred embodiment sliding window assembly 250 installed as a rear window in a truck 252. As is explained in greater detail below, assembly 250 comprises a plurality of glass panels 253, 254, and 255, such that at least one of the panels is slidably positionable along one or more tracks.

FIGS. 26-29 and 34 illustrate in greater detail window assembly 250 shown in FIG. 24. Assembly 250 comprises a plurality of glass panels such as panels 253, 254, and 255, that are either bonded by the preferred adhesive to one or more track members 256, 257, or are slidably positionable therein. Track members 256 and 257 are channelled members adapted to receive panels 253, 254, and 255. As illustrated in FIGS. 26 and 27, it is preferred that one or more panels, such as panel 253 and panel 255 be bonded along their upper peripheral edges to upper track member 256, and be bonded along their lower peripheral edges to lower track member 257 by a layer of the preferred embodiment adhesive 258. Panel 254 is preferably not bonded to either track member so that it is slidably positionable within those tracks. Depending upon the configuration of assembly 250, panel 254 may be slid alongside either or both panels 253 and 255. Assembly 250 may further comprise a latch member 259 bonded to one of the glass panels of assembly 250, such as panel 254, and a corresponding pin member 260 bonded to an adjacent corresponding glass panel; such as panel. 255. Latch 259 and pin 260 are bonded to glass panels 254 and 255, respectively, by a layer 261 of the preferred embodiment adhesive. Assembly 250 may further comprise one or more sealing members disposed on the lateral edges of the slidable panel, to provide a seal between adjacent panels and thereby minimize drafts or other undesirable phenomena such as wind noise when assembly 250 is in a moving vehicle. Moreover, the sealing members may also be configured to provide a handle or edge that can be readily grasped to facilitate the positioning of a panel. FIGS. 26 and 28 illustrate glass panel 254 having sealing members 262 and 263 bonded to the lateral peripheral edges of panel 254 by a layer 264 of the preferred embodiment adhesive. Sealing members 262 and 263 are preferably configured to provide a channel or receiving surface 265 to bond to the edge of panel 254, a sealing portion 266 or lip which sealingly engages an adjacent panel, and a handle portion 267 adapted for easy grasping by a user wishing to slide glass panel 254 along tracks 256 and 257. As best illustrated in FIG. 34, a glide member 350 is preferably disposed in track member 257 to facilitate sliding panel 254 in the channel provided by track 257. Glide member 350 is preferably formed from a low friction plastic.

FIG. 25 illustrates an alternate embodiment of a sliding window assembly 270, in which at least one of glass panels 272 and 274 is slidably positionable along a track (not shown) such that panels 272 and 274 can be moved away from one another, e.g. to allow air to pass between a passenger compartment and the outside environment, or can be abutted against one another, or substantially so, to prevent air passage, e.g., to prevent loss of heated or cooled air in the passenger compartment. FIG. 25 further illustrates latch and pin components 276 and 278, respectively, that lock or otherwise secure panels 272 and 274 to one another. Latch 276 and pin 278 components are bonded to panels 272 and 274 by the preferred embodiment adhesive.

FIG. 35 illustrates an alternate embodiment of a sliding window assembly in which a single channel track 360 is bonded to a glass panel 364 by a layer 366 of the preferred embodiment adhesive. Disposed between the peripheral edge of glass panel 362 and track 360 is previously described glide member 350 to facilitate sliding of panel 362. When installed in a vehicle, panel 364 may be either fixed or movable with respect to the vehicle.

FIGS. 30 and 31 illustrate a preferred embodiment of a hinge component 300 bonded to a glass panel 301 by a layer 302 of the preferred embodiment adhesive. Hinge component 300 comprises a mounting member 305 for contacting the layer of adhesive 302, a member 306 for affixment to a vehicle mounting surface 307 via threaded fastener 308. Hinge 300 has a flexible U-shaped region connecting mounting member 305 to member 306, which provides relative movement between members 305 and 306. Hinge 300, as will be appreciated from FIGS. 30 and 31, is ideally suited for providing hinged affixment between a panel and a vehicle for applications where the panel travel is less than about 20 degrees about the hinge axis. Examples of such applications include the side window shown in FIG. 2.

The rapid set, rapid cure, two-component urethane adhesives described herein exhibit surprising and remarkable ability to rapidly bond glass to other materials in such a manner that the resulting bond can withstand highly localized loads without failing. As previously explained, many new window designs require attachment of mounting members or other attachment members to glass which results in highly concentrated static loads and/or dynamic loads at the adhesive bond, as might be the case in a movable window. Often, there is minimal available surface area on the glass or attachment member for bonding. Such minimal surface area limits the available area for distributing these loads and stresses over the adhesive bond. It is even more remarkable that the bonded assemblies described herein, particularly, those utilizing the preferred adhesives, retain their bonded configuration under high loads, while concurrently subjected to adverse conditions such as water immersion, vibration, and temperature extremes. It has been found that bonded assemblies utilizing the rapid set, rapid cure, two-component adhesive described herein can withstand localized static tensile loads of at least 5 lbs/in and as high as about 40 lbs/in and in some instances significantly higher loads such as 80 lbs/in without failing as applied within OEM ranges of −40° C. to 100° C.

A wide array of materials may be bonded to glass by use of the preferred adhesives described herein, Such materials may include for example metals, coated metals, plastics, coated plastics, or composites or combinations thereof.

The thickness of the adhesive layer generally depends upon the end use applications for the bonded assembly, the surface characteristics of the glass substrate and the attachment member to be bonded to the glass, and the required bond strengths. If the adhesive layer is too thick, elongation of the adhesive layer, for instance upon application of a shear stress, allows movement between the bonded components or substrates and may result in creep and/or peel. If the adhesive layer is too thin, the bonded assembly may have poor durability, insufficient squeeze out or component coverage, or other phenomena in which adhesive material migrates away from the bond interface. Moreover, if the thickness of the adhesive layer is not uniform, there may be regions on the surfaces of the bonded components that have insufficient coverage of adhesive, thereby resulting in voids or other undesirable variations in coverage. The preferred thickness for the adhesive layer is from about 0.01 mm to about 4.0 mm, more preferred being from about 0.25 mm to about 2.0 mm and the most preferred thickness being about 0.5 mm to about 1.0 mm.

The preferred embodiment method of adhering attachment members to glass substrates is to prime the glass surface, and deposit an effective amount of a preferred embodiment adhesive described herein on one or both surfaces of the attachment member and primed glass substrate to be bonded, and place the attachment member and substrate in the desired position for bonding. The term "effective amount" refers to an amount of adhesive such that the attachment member that is adhered to the substrate is securely bonded thereto after curing of the adhesive. Typically, an effective amount is an amount that results in an adhesive layer thickness of between about 0.01 mm and about 4.0 mm, more preferably about 0.25 mm to about 2.0 mm, and most preferably from about 0.5 mm to about 1.0 mm.

Preferably, the adhesive is applied to a glass frit layer which is applied to the glass panel. Thus, in forming the glass assemblies described herein, it is preferred that the various assemblies comprise such a glass frit layer on the surface of the glass substrate. The flit layer helps to shield the adhesive applied thereto from the ultraviolet radiation of sunlight. Exemplary descriptions of forming frit layers on glass surfaces are provided in U.S. patent application Ser. No. 07/898,094 filed Jun. 12, 1992, now issued as U.S. Pat. No. 5,443,673, which is herein incorporated by reference.

Optionally, the surface of the glass to be bonded may be cleaned prior to bonding such as by washing with isopropyl alcohol or a suitable detergent followed by drying Similarly, the surface of the component or other substrate to be bonded to the glass may also be washed and dried prior to bonding.

Referring again to FIGS. 2-4, the preferred adhesive, i.e., the rapid set, rapid cure, two component urethane adhesive, may be utilized to bond window assembly 12 attachment members such as hinges, mounting members, latches, and handles to glass panel 24 for subsequent attachment of window assembly 12 to vehicle 10. In order to form such bonds, an effective amount of the adhesive is deposited on the attachment member to be bonded, and/or to the appropriate area of the glass at which the attachment member is to be bonded. The attachment member is then engaged with the glass via the adhesive, and adhesive allowed to set. Upon curing, a strong, durable bond is formed between the attachment member and the glass.

The preferred adhesive dispensing method is performed by using a metering unit and a mixing unit to both mix and dispense the adhesive. The metering unit should preferably dispense a very accurately controlled volume of each component to the mixing unit. This volume must be constant for a specific flow race such that the ratio of the isocyanate component to the polyol component does not change as the total dispensed volume and flow rate change. Preferred metering units are gear pump-based dispensing units such as those supplied by $EMC^2$ of Sterling, Heights, Mich. The most preferred metering units are adjustable gear pump-based units. The preferred mixing unit may be either a static mix tube or a dynamic urethane RIM mix head like those supplied by Admiral of Canton, Ohio; Cannon of Mars, Pa.; Kraus Maffai of Germany, and others. For applications involving most automotive bonded assemblies, the most preferred mixing unit is a static mix tube 0.25 inches in diameter and 6 inches long, in association with a 24 element KINEX, a sequential reverse static mixer.

In order to promote uniformity and accuracy of dispense volume, mixing and ratio control, it is most preferred that the isocyanate and polyol components of the adhesives described herein be delivered to the dispense metering unit and mixing unit through thermally controlled lines, such as those provided by Hart Ind. Supply of Middletown, Ohio.

It is also preferred that the adhesive material be deposited upon the glass or attachment members to be adhered to the glass, with the aid of a robot. Robotic deposition or other automatic procedures promote repeatability in both application and open time control that manual operation may not be able to deliver. An example of forming a bonded vehicular glass assembly by robotic assembly is described in greater detail below.

It may also be desirable to accelerate the set and cure times of the adhesive. Acceleration of adhesive set and cure times can be accomplished by heating and/or by utilizing chemical agents. The use of chemical agents is discussed in greater detail below. Acceleration by heating may be performed by induction curing, infra red heating, or other methods of heating the adhesive.

In the preferred embodiment of the two-component urethane adhesives described herein, the polyol component utilized includes one or more polyols and one or more high amine density plural amine compounds, hereinafter referred to as HADPACs. The preferred amount of HADPAC typically ranges from about 2% to about 20%, and most preferably from about 5% to about 10% by weight of the polyol component. In addition, the adhesives 25 utilize a filler agent in either the polyol component, the isocyanate component, or both. The filler agent is preferably utilized in an amount from about 15% to about 50% of the total weight of the polyol and isocyanate components. Moreover, the adhesives preferably utilize a particular ratio of isocyanate functionality to hydroxy and/or amino functionality of from about 0.9 to about 2.0, more preferably from about 1.03 to about 1.4, and most preferably from about 1.1 to about 1.3.

A HADPAC is a high amine density plural amine compound that may be either aromatic or nonaromatic, having an amine to carbon ratio of from about 1.0 to about 0.25:1 with the provisos that the compound (a) contain at least 3 amine groups, except if the compound is aromatic, then the compound may contain as few as 2 amine groups due to plate-like stacking phenomenon and (b) the compound contain from 2 to 24 carbon atoms. The molecular weight range for these amines typically ranges from about 115 to about 5000, and more preferably from about 210 to about 290. A particularly preferred HADPAC is a penta-amine or hexamine containing 11 or 12 carbon atoms, such as the aminated reaction product of pentaerythritrol, glucose; or sucrose. The most preferred HADPAC is aminated sucrose or aminated pentaerythritrol. The amination reaction may be performed by reacting pentaerythritrol, glucose, or sucrose, with an excess of, for example, but not limited to, ammonia, methyl amine, ethyl amine, and other amino alkanes of the formula $C_xH_nNH_2$ where x ranges from about 1 to about 20, and n is such that the alkane is fully saturated. In a preferred embodiment, x is from about 1 to about 6, and most preferably, from about 1 to about 3.

As will be appreciated by those skilled in the art, during formation and isolation of a HADPAC, there will typically be a distribution of compounds accompanying the HADPAC. Thus, it is recognized that the function of the HADPAC in the adhesives described herein stems from not only from the HADPAC, but also from the distribution of related compounds accompanying the HADPAC.

Although not wishing to be bound to any particular theory, it is believed that upon curing of the adhesives described herein, cross-linking occurs between the HADPACs, and isocyanate groups to a degree such that a higher cross-link density is achieved in the preferred embodiment adhesives as compared to most other urethane adhesives. The polyols in the polyol component may include polyols such as dials, trials, tetrols, pentols, hexols, heptols, and octols. Examples of polyol compounds that may be employed in the polyol component include, but are not limited to, propylene glycol, ethylene glycol, glycerine, trimethylolpropane, 1,2,6-hexanetriol, pentaerythritrol, methyl glucoside, sorbitol, and sucrose. It is envisioned that a wide array of polyalkylene glycols (ethylene, diethylene, dipropylene), various glycerine triols and trimethylol propanes, and derivatives thereof could be utilized. Other preferred polyols include polyether or polyester polyols with hydroxyl equivalent weights (hydroxyl equivalent weight is the molecular weight per hydroxyl group in the compound) of between about 50 and about 2000, such as a blend of dials, trials, and pentols and sucrose initiated polyols. For end use applications expected to be exposed to water or moisture, polyether polyols are especially preferred in view of their relatively high degree of hydrolytic stability.

In addition to the previously noted preferred HADPAC, other amines may be utilized in the polyol component. Such amines may be formed by reaction between propylene oxide and/or ethylene oxide, and amine compounds or other nitrogen-containing compounds such as 2.0 ammonia. Examples of suitable amine compounds for such reactions include, but are not limited to triethanol amine, ethylene diamine, toluene diamine, diphenylmethane diamine, diethylenetriamine, aniline, methyldiethanolamine, triethanolamine, trispropanolamine, diethyl toluelene diamine, and other alkyl amines.

Examples of the isocyanate compounds that may be utilized in the isocyanate component include, but are not limited to, diphenylmethane diisocyanate (MDI), typically polymeric MDI, and its isomers such as 4.4'-MDI 2.2'-MDI and 2,2'-MDI; and tolylene diisocyanate (TDI) and its isomers. It is, also possible to use other isocyanates, either alone or in combination with one or both and TDI. The preferred combination of isocyanates for the isocyanate component is a majority fraction of MDI prepolymers, such as Dow Chemical's PAPI® 27, and minority fraction of monomeric isocyanates, having an iso-equivalent weight between 143 and 181 (iso-equivalent weight is the molecular weight per isocyanate group in the compound), and minority fraction of a mixture of polymeric isocyanates such as a polymeric polyisocyanate available from Dow Chemical, dimers and trimers of MDI, and alternate prepolymers of MDI.

One or more filler agents are incorporated in either the polyol component, the isocyanate component, or both. Although not wishing to be bound to any particular theory, it is believed that the filler agent creates a porous structure within the adhesive, which enables moisture to permeate into and throughout the adhesive to effect isocyanate cross-linking via urea formation with any unreacted isocyanates. The preferred amount of filler agent is from about 15% to about 50% of the total weight of the polyol and isocyanate components. More preferably, the amount of filler agent is from about 20% to about 30% of the total weight of the polyol and isocyanate components. Most preferably, the amount of filler agent is about 25% of the total weight of the polyol and isocyanate components. Examples of suitable filler agents include, but are not limited to, silicates such as magnesium silicate, silicas such as crystalline silica and quartz silica calcium carbonate, talc and combinations thereof. The preferred filler agent is a combination of talc and silica.

A typical urethane adhesive system employs a ratio of isocyanate functionality to hydroxy and/or amino functionality of from about 1.03 to about 1.07. A ratio higher than about 1.07 leads to an adhesive which is excessively brittle and relatively slow curing. A ratio less than about 1.03 leads to a cured adhesive which is too safe for use in most industrial applications. The preferred embodiment adhesives, it has been surprisingly discovered, utilize a ratio of isocyanate to hydroxy and/or amino functionality of from about 0.9 to about 2.0, more preferably from about 1.03 to about 1.4, and most preferably from about 1.1 to about 1.3. These ratios are desirable since by utilizing greater amounts of isocyanate, the resulting cured adhesive has greater heat resistance without sacrificing elongation or tensile strength.

A wide array of optional components may be incorporated in the preferred adhesives depending upon the application and desired end use requirements for the bonded assembly. For example, various UV blockers, stabilizers and absorbers may be incorporated in the adhesives to minimize adhesive degradation from sunlight. Chain extenders may be utilized such as ethylene glycol, butane dial, ethylene diamine, and diethyl toluene diamine. Various cross-linking agents may be utilized such as, but not limited to, oxypropionated sucrose, aliphatic amines, pentarythrathols, aminated polyols or high hydroxyl number materials such as 1,2,6-hexanetriol, 1,1,3-trimethylolpropane, and glycerine for example. In addition, pigments or colorants may be added to the adhesives. One or more diluents or thixotropic may be added to the adhesive composition to modify the viscosity and related processing characteristics of the resulting compositions. It may also be desirable that one or more additives such as thermal stabilizers, antioxidants, and surfactants may be utilized in the adhesive. All the foregoing optional components may be added to the polyol component, and where applicable, to the isocyanate component, or to both prior to mixing, or to a third or other component which can be added to the mixture prior to setting to form the desired adhesive.

Depending upon the characteristics desired for the setting and curing phases of the adhesive, it may be desirable to add one or more catalysts to accelerate the setting and curing phases. Examples of catalysts for the adhesives of the preferred embodiment include, but are not limited to, tertiary amines such as 1,4-dinzabicycla [2,2,2] octane (triethylene diamine), N-methylmorphaline, N-ethylmorphaline, triethylamine, N-methyldiethanolamine, N,N-dimethylaminoethanol, N,N-diethylaminoethanol, triethanolamine, tetramethylguanidine, N,N,N',N'-tetramethylethylenediamine, N,N-dimethyl $C_{10}$-$C_{16}$ amine, N,N dimethylcyclohexylamine, N,N-dimethylpiperazine, 1,2,4-trimethylpiperazine, bis-(2-hydroxypropyl)-2-methylpiperazine, bis-(beta-dimethylaminoethyl) ether, and organotin compounds such as stannous octoate, stannous oleate, dibutyltin dilaurate, and dibutyltin diacetate.

There are commercially available urethane adhesives which exhibit the preferred rapid set, rapid cure, and high-strength characteristics, which the present inventors have discovered provide surprisingly superior bonds between glass and other components or materials. One such commercially available two-component urethane adhesive having all the above described properties, and which is the most preferred adhesive, is Essex 73100 isocyanate component, and either 73002 or 73003 polyol component available from Essex Specialty Products, Inc., a subsidiary of The Dow Chemical Company. The Essex 73100 isocyanate component comprises a proprietary polyurethane prepolymer(s) which is believed to primarily comprise prereacted relatively long, branched chain molecules of diphenylmethane diisocyanate (MDI) reacted with a combination of relatively short and moderate chain length diols, triols, and moderate chain length diamines. It is further believed that the ends of these chain molecules are blocked with isocyanate groups, and there exists a proportion of free MDI molecules that are present and available for reaction. The 73100 component further comprises various fillers, such as magnesium silicate, crystalline silica, and calcium carbonate. The solids content and approximate amount 0 f filler agents in the Essex. 73100 component is about 24%. The Essex 73002 polyol component comprises proprietary polyurethane prepolymer(s) of polyols, dials, N-phenyl diethanolamine, and a penta-amine that is initiated from pentaerythritrol and sucrose molecule, i.e., a HADPAC. The 73002 polyol component further comprises fillers, catalysts, and likely includes surfactants. The fillers are calcium carbonate and quartz silica. The catalyst is an amine-based catalyst. The solids content and approximate amount of filler agents in the 73002 component is 27%.

This most preferred, commercially available adhesive system has a combination of properties and characteristics that render it particularly well suited for use in forming automotive window or panel assemblies and for installing such assemblies in vehicles. The combination of properties include relatively high stability and resistance to water, minimal creep even at relatively high temperatures thereby resulting in a structurally rigid bond, ability to impart remarkably low stress upon the underlying substrate upon curing, and as previously described, relatively fast set and cure times. The present inventor has further found that this adhesive provides surprisingly strong and durable bonds between glass and other materials. The inventor has further found that this adhesive is particularly well suited for fanning bonds between vehicle mounting surfaces and attachment members that are subjected to and which bear dynamic loads.

As previously noted, it may be desirable to utilize an adhesion promotor and/or a primer. Adhesion promoting compounds generally include silanes and amino silanes such as available from Dow Corning, Lord Chemlock, General Electric and Essex. Specific examples include diamino-tri-methoxy silanes available under the designations Lord Chemlock 134/144 and similar materials from Essex such as Essex 435.18 and 435.20. Other silanes not limited to diamino or tri-methoxy forms may also be suitable. A second group of adhesion promoters are titanium or zirconium coupling agents such as available from Kenrich PetroChemical Inc. of Bayon, N.J., which enhance the bonding ability of the adhesive to the substrate. Alternatively, or in addition to an adhesion promoter, one or more primers or single component urethane adhesives may be used such as urethane based, isocyanate-rich, moisture-curable, urethane prepolymers such as Morton Yokohama MS-90 available from Morton International of Ridgewood, Ill. or Essex 435.20a. Additional examples of substrate primers include but are not limited to Essex: 435.32, for applications in which the substrate to be bonded to glass is metal or plastic. Although these adhesion promoters or primers are preferred, they are not the only adhesion promoters or primers available which may be equally if not more suitable for the application.

The adhesion promoter and/or primer applied to the glass surface should form a layer having a thickness such that the entire surface of the area of the glass to be bonded, or substantially so, is wetted by the adhesion promoter or primer. The preferred thickness range for the adhesion promoter or primer materials is from about 0.01 mils to about 3.5 mils, more preferably from about 0.05 mils to about 2 mils, and most preferably from about 0.1 mils to about 1.0 mils. It is undesirable to apply an excessive amount of adhesion promoter or primer on the glass as such leads to interlayer polymeric silane cross-linking Such silane polymerization results in a much weaker bond than the silane-urethane primer link. Many commercial suppliers for adhesion promoters or primers recommend that after application, of adhesion promoter or primer to the substrate to be bonded, that excess promoter or primer material be wiped off with a clean cloth. This wipe off step results in additional time and labor, which is clearly undesirable at the commercial level. The present inventor has found that a more desirable way of removing excess adhesion promoter or primer material after application is to allow solvents in those materials to flash off Sufficient flash off was found to occur at ambient temperatures in a period of only from about 5 seconds to about 15 minutes.

One or more layers of adhesion promoters and/or primers are preferably applied to the glass substrate and/or other substrates or attachment members to be bonded thereto prior to bonding. A preferred combination is to utilize an amino silane adhesion promoter, such as Essex 435.18 silane coupling agent, adjacent the glass surface, followed by a layer of a single-component urethane primer, such as Essex 435.20A primer, deposited on the layer of adhesion promoter. The adhesive is then deposited on the primer layer. It is most preferred to apply the two-component urethane adhesive to the adhesion promoter and/or primer within 96 hours of application of the adhesion promoter and/or primer to the glass surface.

A preferred embodiment bonded vehicular glass assembly suitable for use in a Chrysler minivan having a layer of frit and two hinges and a clevis bonded to a glass panel was formed by utilizing robotic assembly and deposition of adhesion promotor, primer, and adhesive as follows. A tempered glass panel is obtained, such as from MaGraw Glass of Detroit, Mich. The glass may be of any suitable grade, such as clear glass, privacy glass, solar tint, or other grades known to those skilled in the art. The glass is coated with a frit layer, such as that available from Cerdac of Wash., Penn. under the designation Cerdac 2247. The glass panel is dimensionally inspected and optically inspected for the existence of scratches, excess fit material, or other contaminating agents.

The glass panel is then placed in a retaining fixture, centered, and positioned for subsequent application of adhesion promoter. It is preferred to utilize an ABE Robot, available from ABB Robotics of Rochester Hills, Mich., a fully programmable multi-axis servo controlled robot, for applying the adhesion promoter, primer, and adhesive. To apply adhesion promoter to the surface of the glass panel, the ABE Robot is fixtured with a Nordson Drip and Drag, a mechanical liquid application device available from Nordson Corporation of Amherst, Ohio. The ABB Robot is programmed to obtain a piece of wool felt from a spool dispenser located near, and preferably above, the fixtured glass panel and wipe the felt material impregnated or loaded with adhesion promoter across desired regions of the glass panel.

Silane adhesion promoter available from Essex under the designation Essex 435.18, IS pumped in small volumes to the surface of the felt. These small volumes are referred to as stitches. The stitches are adjusted such that a sufficient volume of the adhesion promoter is present on the felt to provide a continuous wet streak of adhesion promoter on the glass surface as the felt is wiped over the panel. The amount of the adhesion promoter deposited on the panel surface should be just enough to wet the glass. The adhesion promoter is allowed to flash off, typically for not less than 10 seconds, and not more than 5 minutes. In most instances when utilizing the Essex 435.13 adhesion promoter at room temperatures, flash off occurs in less than about 15 seconds.

After the Essex 435.18 adhesion promoter has been allowed to flash off so that the panel surface is relatively dry, a urethane primer is applied by the ABB Robot. Preferably, the primer is applied to exactly the same area to which the adhesion promoter was deposited upon. The primer is applied in the same fashion as the adhesion promoter. The primer is preferably Essex 435.20A primer.

The primer is allowed to flash off for a time period of typically between about 90 seconds up to about 96 hours. The primer thickness should be controlled to a nominal value of between about 0.1 mils and about 1.5 mils dry thickness. When utilizing Essex 435.20A primer, the typical thickness for this primer layer is between about 0.2 mils and about 0.6 mils dry thickness, and typical flash off time is about 3 minutes.

Upon drying of the primer layer, the glass panel is moved to the urethane bonding area and repositioned if necessary, in the appropriate retaining fixture. The same type of ABS Robot is also preferably programmed to acquire and position the attachment members for bonding to the concave surface of the glass panel, i.e. the two hinges and one clevis. The hinges are preferably of the type illustrated in FIGS. 30-31. The hinge member for bonding to the glass panel has a mounting footprint of about 6 in$^2$. That member also contains a plurality of perforations to allow adhesive to flow through the perforations and thereby promote affixment of the hinge to the glass panel. The clevis is preferably of the type illustrated in FIGS. 5-6. The base of the clevis has a circular mounting footprint of about 1.25 in$^2$. The base preferably has a plurality of perforations formed in it as previously explained with regard to the hinge member.

The preferred adhesive, Essex 73100/73002 comprising 73100 polymeric isocyanate component and 73002 polymeric polyol component, is metered and mixed in a ratio of 1.3:1, respectively, by the previously described EMC$^2$ dispensing unit and KINEX 24 element static mixer. This ratio allows for an isocyanate excess, or rich mixture which sets in about 90 seconds. The gears of the ENC$^2$ unit are set utilizing 60 and 48 teeth to yield the 1.3:1 dispense ratio. The robot acquires adhesive from the KINEX 24 mixer. The hoses transferring adhesive or adhesive components are preferably thermally jacketed and the dispensing head is set to maintain the adhesive temperature at 95° F.

The robot dispenses about 5.8 cubic centimeters of the mixed two-component urethane adhesive on each hinge, and about 1.2 cubic centimeters on the mounting surface of the clevis. The robot positions the components on the glass surface in less than about 30 seconds from the time of dispense, and typically less than about 17 seconds. The robot then clamps the clevis in place for about 30 seconds, and similarly locates and holds the hinges on the desired location on the glass surface for about 30 seconds. Once the components have been set by the adhesive, the glass is then moved to the end of the production line. The assembly is then placed in a work in progress rack and packed in its shipping container shortly after bonding, e.g. about 7 minutes after bonding.

Bonds formed from the preferred embodiment adhesives described herein exceed bond strength OEM requirements set by most automotive companies and have been successfully tested in actual usage on vehicles. Bonds formed from the preferred embodiment adhesives exhibit exceedingly high-strength against tensile, torque, and shear forces, such that bonded assemblies which have been immersed in a heated water bath for 500 hours can withstand a tensile force of over 795 psi without failure, This is explained in greater detail below in the discussion of experimental comparative testing that was conducted between the most preferred, commercially available two-component urethane adhesive and various single-component urethane adhesives that represent the state of the art for forming bonded automotive glass assemblies.

EXPERIMENTAL TESTING

Tensile Tests

Testing was performed to compare the bond strength of glass panel to metal attachment members made utilizing the preferred embodiment process with similar glass panel to metal attachments bonded utilizing several single-component urethane adhesives, Bond strength was measured after bonded assemblies, utilizing the various adhesives, were fully immersed in a water bath at 80° C. for 100 or 500 hours. Samples comprised a glass window substrate having clevises adhesively bonded to the glass surface by the various adhesives. Each sample bonded with Essex adhesives utilized a layer of Essex 435.18 silane coupling agent deposited on the glass panel, and a layer of Essex 435.20a primer disposed on the layer of silane coupling agent. Each sample bonded with Morton Yokohama adhesives utilized Morton Yokohama MS-90 primer. In all samples, adhesive was deposited on the primer layer. The water bath consisted of a stainless steel tank fitted with an aeration system and filled with deionized water. The temperature of the bath was maintained at 80° C.±2° C. As evaporation of the water occurred, the tank water level was restored by adding deionized water. Samples were completely immersed in an upright position in the water bath for the specified time period. The samples were adequately spaced from one another to allow water circulation between the assemblies. After immersion in the water bath for the specified time period, the assemblies were removed and subjected to a tensile pull test. The assembly to be tested was placed in a stationary fixture such that the clevis to be pulled from the assembly was aligned with the pulling fixture. The pulling fixture was then attached to the clevis component, and additional adjustments were made with respect to the position of the pulling fixture to ensure that the pulling fixture exerted a tensile force on the bonded component perpendicular to the underlying glass substrate. Pulling was performed at a rate of 25.4 mm per minute until a peak tensile force was reached or failure occurred. The peak tensile force was recorded and, if failure occurred, the mode of failure was noted.

Table 1, as set forth below, summarizes the results of the tensile pull tests performed after immersion in the heated water bath. Metallic clevis components having a circular base with a surface area for bonding of 0.49 in$^2$ and bonded to the glass window substrate were subjected to the tensile pull test previously described. The Essex two-component adhesive, comprising Essex 73100 isocyanate component and Essex 73002 polyol component, is a most preferred adhesive in accordance with the present invention. The other compositions noted in Table I are representative of other types of adhesives to which the present invention provides a superior alternative over. Morton Yokohama WS-70FK is a urethane-based, isocyanate-rich, moisture-curable, single-component urethane prepolymer adhesive. Essex 57302 is a moisture-curable, single-component adhesive. Morton Yokohama WS-30 is a moisture-curable, single-component adhesive.

TABLE 1

Tensile Testing of Bonded Assemblies After Immersion in Water Bath at 80° C.

| Adhesive | Trial | Period of Immersion (hrs) | Peak Tensile Force (lbs/in$^2$) | Failure % |
|---|---|---|---|---|
| Essex 73100 and 73002 | 1 | 100 | 286* | 0 |
|  | 2 | 500 | 286* | 0 |

TABLE 1-continued

Tensile Testing of Bonded Assemblies After
Immersion in Water Bath at 80° C.

| Adhesive | Trial | Period of Immersion (hrs) | Peak Tensile Force (lbs/in$^2$) | Failure % |
|---|---|---|---|---|
| Components | 3 | 500 | 795* | 0 |
|  | 4 | 100 | 795* | 0 |
|  | 5 | 500 | 286* | 0 |
| Morton | 1 | 100 | 286* | 0 |
| Yokohama | 2 | 500 | 130 | 100 |
| WS-70FK | 3 | 500 | 338 | 100 |
|  | 4 | 100 | 795* | 0 |
|  | 5 | 500 | 130 | 100 |
| Essex | 1 | 100 | 286* | 0 |
| 57302 | 2 | 500 | 207 | 100 |
|  | 3 | 500 | 572 | 100 |
|  | 4 | 100 | 795* | 0 |
|  | 5 | 500 | 207 | 100 |
| Morton | 1 | 100 | 267 | 10 |
| Yokohama | 2 | 500 | 85 | 100 |
| WS-30 | 3 | 500 | 236 | 100 |
|  | 4 | 100 | 745 | 10 |
|  | 5 | 500 | 85 | 100 |

*Test was stopped at the indicated peak tensile force value.

It is clear from a review of Table 1 that the adhesive according to the most preferred embodiment, i.e., Essex 73100 and 73002, provides significantly stronger bonds after immersion in the heated water bath than the conventional single-component adhesives tested. In trial 2, bonded assemblies formed using the adhesive of the most preferred embodiment, i.e., Essex 73100 and 73002 components, after 500 hours of water immersion, withstood a peak tensile force of 286 lbs/in$^2$ without any failures. In contrast, all bonded assemblies formed from the single-component urethane adhesives failed at significantly lower loads. Assemblies formed from the Morton Yokohama WS-70FK adhesive all failed, failure occurring at a peak value of only 130 lbs/in$^2$. Assemblies formed from the Essex 57302 adhesive all failed, failure occurring at a peak value of only 207 lbs/in$^2$. Assemblies formed from the Morton Yokohama WS-30 adhesive all failed, failure occurring at 85 lbs/in$^2$ Similarly, in trial 3, the results were even more striking. Bonded assemblies formed utilizing the most preferred embodiment adhesive withstood a peak tensile force of 795 lbs/in$^2$ without any failures. In contrast, bonded assemblies utilizing the other adhesives all failed, and failed at significantly lower values, i.e., 338, 572, and 236 lbs/in$^2$.

It has surprisingly been found that bonds on glass surfaces formed from the preferred adhesives described herein are exceptionally strong and often exceed the material strength of the component or glass substrate. Components bonded to glass by the methods and adhesives described herein are able to withstand tensile forces of at least 500 psi, preferably 700 psi, and most preferably 795 psi without separation from the underlying glass surface. Such bond strength exceeds OEM tensile bond strength requirements set by most automobile manufacturers, which is typically 300 psi.

Torque Tests

Figure 9:
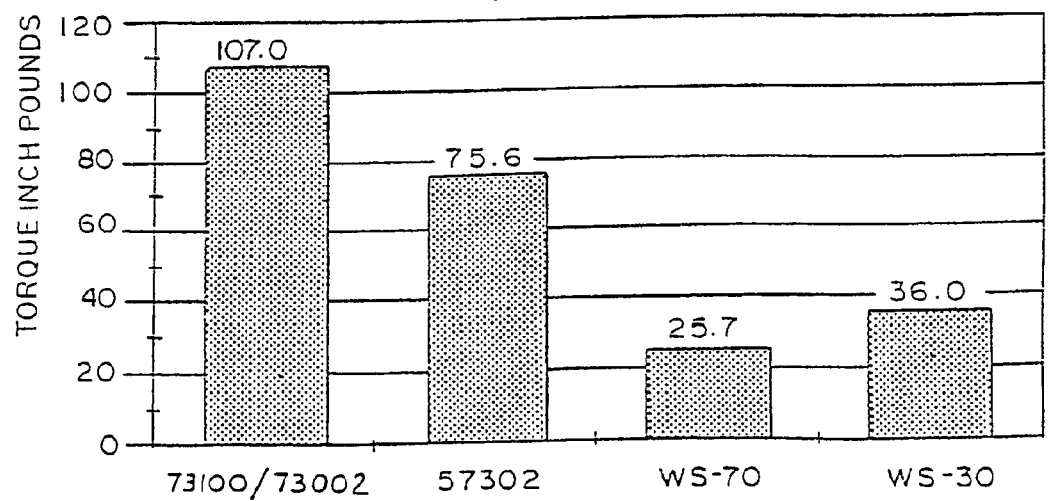
FIG. 9 is a graph of maximum torque values measured for a most preferred embodiment adhesive and various single-component urethane adhesives that were tested.

Further testing was performed in which maximum torque values before failure were measured for bonded assemblies utilizing the same four adhesives employed in the previously described tensile testing. Each assembly utilized a clevis having a threaded fastener and a ½ inch diameter circular mounting base that was bonded by each of the previously described adhesives, to an appropriately primed glass surface ("appropriately primed" referring to use of the previously described primers I each with its particular adhesive). Two threaded nuts were placed on the threaded fastener portion of each bonded clevis. A torque wrench having a torque indication scale was then used to apply a torque to each bonded clevis until failure occurred. FIG. 9 illustrates maximum torque values for each of the adhesives tested. The clevis bonded with the most preferred, commercially available Essex 73100 and 73002 system withstood a significantly greater load, i.e., 107 inch-pounds, than did the other devises bonded with Essex 57302, and Morton Yokohama WS-70FK and WS-30.

Vibration Tests

Additional testing was performed by subjecting a bonded vehicular window assembly to vibration of varying frequency and amplitude while concurrently subjecting the assembly to high and low temperatures. In this test, the bonded vehicular window assembly utilized was a window assembly produced for use as a side window in a Chrysler minivan. The assembly comprised two hinges and a clevis mount bonded to window glass by the adhesive of the most preferred embodiment Essex 73100 and 73002. The glass of the window assembly weighed about 14.5 pounds, was tempered, had a compound curvature, and measured about 22.25 inches in height, 44 inches in length, and about 5 mm in thickness. The window assembly was formed in the same fashion as the previously described preferred embodiment bonded vehicular glass assembly designed for use in a Chrysler Minivan, i.e. by robotic assembly. The two hinges and one clevis were attached to the concave surface of the glass panel. The window assembly was installed in a window fixture, or window buck. The bonded assembly was subjected to input vibration levels of +10 dB, +11 dB, and +12 dB, at varying frequencies, while concurrently being subjected to temperature cycling over a 12 hour period. Each vibration input profile consisted of sequentially administering nine different frequencies, namely 5, 10, 13, 17, 21, 23, 39, 72, and 1000 hertz, to the assembly being tested. The administration of each vibration input profile was repeated over the duration of the test.

In a first trial, the bonded assembly was subjected to the previously described vibration input profile at an amplitude of +10 dB for a period of 24 hours. During the first half of this trial, i.e., the first 12 hours, the temperature was varied in 2 hour increments at −30° C. and 2 hours at 80° C. until the 12 hours was completed. Thus, for instance the bonded assembly subjected to the vibration input profile of the nine different frequencies repeated over the duration of the test at an amplitude of +10 dB experienced a temperature of −30° C. for 2 hours, then a temperature of 80° C. for 2 hours, then a temperature of −30° C. for another 2 hours, then a temperature of 80° C. for 2 hours, then a temperature of −30° C. for another 2 hours, and lastly, a temperature of 80° C. for 2 hours. The bonded assembly passed this first trial of the test without failure.

After being subjected to the previously described conditions, the bonded assembly was then further subjected to a second 12 hour trial utilizing the same vibration frequency and amplitude input profile as noted above, but even more severe temperature extremes. The second 12 hour temperature cycle for the +10 dB level consisted of repeated exposure in 2 hour increments to temperatures of −40° C. and 100° C. until the 12 hours was completed. This assembly passed this portion of the test without failure.

The assembly was then subject to a second trial, utilizing the same vibration frequency and temperature conditions as the first trial for the same time period of 24 hours. Instead of a vibration amplitude of +10 dB, an amplitude of +11 dB was utilized. The assembly passed this portion of the test without failure.

In a third trial, the bonded assembly comprising the most preferred embodiment adhesive was subjected to the previously described vibration input profile at an amplitude of +12 dB. Temperature cycling was performed by repeated exposure to temperatures of −40° C. and 100° C. for 2 hour periods as described before for a total time of 24 hours. The assembly passed this test without failure. In another vibration test, a window assembly produced for use as a side window in a Chrysler minivan utilizing Essex 73100 and 73002 adhesive components, was subjected to a vibration frequency of 10-50 hertz at +8 dB for 20 hours while the temperature was varied from −30° C. to 80° C. The bonded assembly did not fail. In another vibration test, a similar bonded assembly utilizing Essex 73100 and 73002 components, was subjected to a vibration frequency of 10-50 hertz at +9 dB for 20 hours. The bonded assembly was exposed to temperatures of −40° C. and 100° C. The bonded assembly did not fall.

In yet another vibration test, a similar bonded assembly utilizing Essex 73100 and 73002 components was subjected to a vibration frequency of 10-50 hertz at +10 dB for 20 hours. During vibration testing, the bonded assembly was subjected to temperatures of −40° C. and 100° C. The bonded assembly did not fail.

In yet another vibration test, bonded assemblies were vibrated at room temperature, that is about 20° C., for an extended period of time. Each assembly consisted of a clevis having a the a ¼ inch diameter circular mounting base bonded to an appropriately primed 2 inches×5 inches glass substrate, with either Essex 57100 and 57002 adhesive or Essex 57302 adhesive. After formation of the bonded assemblies, they were aged for a period of 5 weeks while subjected to thermal cycling in accordance with Ford Motor Co. testing specification ESB-M11P33-A Section 3.2.8.

Vibration testing was performed by inducing a vibratory motion to the glass substrate, at frequency of 13 hertz and an amplitude of 0.20 inch, while an 18 pound load was applied to the clevis. The bonded assembly was oriented in a vertical position, i.e., glass substrate in a vertical position, and the 18 pound weight suspended from the clevis bonded to the glass. While in this configuration, the bonded assembly was subjected to the previously noted vibration conditions. Testing was conducted until failure occurred or until at least 100,000 cycles were completed. Table 2 set forth below, illustrates the superior performance of the Essex 57100 and 57002 system over the Essex 57302 system. All but one bonded sample utilizing the most preferred embodiment adhesive successfully withstood over 100,000 vibration cycles before the test was stopped. The bonded assemblies employing the Essex 57302 single component, moisture-curable adhesive all failed before reaching 30,000 cycles. The failure observed was cohesive failure of the adhesive material itself, that is no failure at the bond interface, but instead occurring within the adhesive material.

TABLE 2

Vibration Testing at Room Temperature*
Aged Samples

| Sample # | Essex 57100 and 57002 Components | | Essex 57302 | |
| --- | --- | --- | --- | --- |
| | No. Cycles | Failure | No. Cycles | Failure |
| 1 | >101,000 | NF | 1,800 | coh |
| 2 | >111,000 | NF | 14,500 | coh |
| 3 | 66,000 | coh | 10,500 | coh |
| 4 | >100,000 | NF | 29,500 | coh |
| 5 | >100,000 | NF | 27,800 | coh |
| 6 | >100,100 | NF | 21,500 | coh |

*Test conditions: load: 18 lbs; frequency: 13 Hz; shearing mode on 2 × 5 glass plaques; NF = No Failure; coh = Cohesive Failure, i.e., failure occurring in adhesive material.

In another vibration test, similar in all respects to the previously described testing summarized in Table 2, bonded assemblies were subjected to testing at 80° C. Testing was conducted until failure occurred or until at least 100,000 cycles were completed. Table 3 set forth below illustrates the remarkable performance of the most preferred embodiment adhesive under high temperature conditions. Only one sample failed, the remaining five successfully withstanding over 100,000 cycles. In contrast, the bonded assemblies utilizing the Essex 57302 adhesive all failed (cohesive failure of the adhesive material) before reaching 21,000 cycles.

TABLE 3

Vibration Testing at 80° C.*
Aged Samples

| Sample # | Essex 57100 and 57002 Components | | Essex 57302 | |
| --- | --- | --- | --- | --- |
| | # of Cycles × 10³ | Failure | # of Cycles × 10³ | Failure |
| 1 | >100,000 | NF | 20,600 | coh |
| 2 | >101,000 | NF | 13,100 | coh |
| 3 | 15,000 | coh | 20,600 | coh |
| 4 | >101,000 | NF | 7,500 | coh |
| 5 | >104,000 | NF | 19,000 | coh |
| 6 | >104,100 | NF | 5,700 | coh |

*Test conditions: load: 18 lbs; frequency: 13 Hz; shearing mode on 2 × 5 glass plaques; NF = No Failure; coh = Cohesive Failure, i.e., failure occurring in adhesive material.

Environmental Exposure Tests

Further testing was performed to compare the bond strength of glass to metal bonds formed by the preferred embodiment process, with similar glass and metal assemblies bonded utilizing the single-component urethane adhesives described in the first series of tests, after exposure to various environmental conditions. hi all the tests described below, bonded samples were prepared and tests performed as in the previously described tensile pull tests.

Heat age tests were performed by placing samples to be tested in a forced air heating chamber having means for controlling the temperature within +/−20 C. The bonded assemblies, formed from the same adhesives listed in Table 1 were aged for periods of 168 or 336 hours at 800 C. After aging, the bonded assemblies were subjected to tensile testing. In all instances the adhesive according to the most preferred embodiment. i.e., Essex 73100 and 73002, performed at least as well as or better than the other single-component urethanes.

Humidity adhesion testing was performed in which bonded assemblies, formed from the same adhesives listed in Table 1, were placed in a chamber at 33° C. with an atmosphere having a relative humidity of 95% to 100% for various periods of time. Testing was performed in accordance with Chrysler test specification LP 463PB-9-01. In all instances the 5 adhesive according to the most preferred embodiment, i.e., Essex 73100 and 73002, performed at least as well as or better than the single-component urethanes. The most preferred embodiment adhesive generally performed better than both Morton Yokohama adhesives, WS-70FK and WS-30, in that it exhibited a lower failure rate.

Environmental cycling tests were performed by exposing the bonded samples to five repeated cycles of 16 hours at 80° C., 24 hours at 38° C. and relative humidity of 98% to 100%, and 8 hours at −29° C. The tests were performed in accordance with Chrysler testing specification LP 435CB-10-01. In all instances the adhesive according to the most preferred embodiment, i.e., Essex: 73100 and 73002, performed as well as or better than the conventional single-component urethanes.

Additional testing was performed in which bonded assemblies utilizing Essex 73100 and 73002, Morton Yokohama WS-70FK, Essex 57302, and Morton Yokohama WS-30 were exposed to a temperature of −30° C. for 192 hours. Resistance to acetic acid, salt spray, and windshield washer solvent were also tested. In all instances, assemblies formed according to the preferred process described herein and utilizing the Essex 73100 and 73002 components, performed at least as well as or better than assemblies utilizing the conventional adhesives, 57302, WS-70FK, and WS-30.

Stress Tests

Stress testing of bonded assemblies was performed upon bonded assemblies, each utilizing one of the four previously described adhesives, i.e. Essex. 73100 and 73002, Morton Yokohama WS-70FK, Essex 57302, and Morton Yokohama WS-30, to bond clevis attachments to appropriately primed, untempered glass surfaces. After sufficient curing of each assembly, the bonded assembly was visually examined for stress as follows. Each bonded assembly was positioned adjacent a source of polarized light, and light directed toward the area of glass having the cured adhesive deposited thereon. The region of untempered glass surrounding the cured adhesive was visually examined by use of a polarization filter. Stress imparted to the glass would be indicated by stress lines appearing in the glass, which are observable by use of the polarization filter. Bonded assemblies utilizing Morton Yokohama adhesives and the Essex 57302 adhesive exhibited relatively large amounts of stress imparted to the glass. Surprisingly, the bonded assembly utilizing two-component Essex adhesive 73100 and 73002 displayed virtually no stress imparted to the glass.

Shear vs. Cure Time

Figure 10:
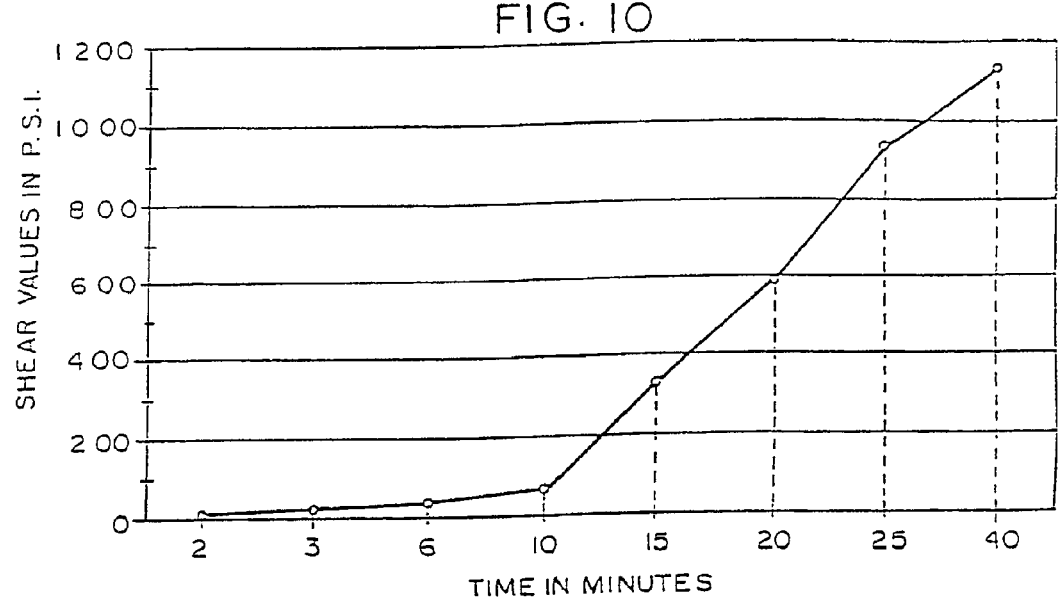
FIG. 10 is a graph of shear values versus cure time for the most preferred embodiment adhesive.
Figure 11:
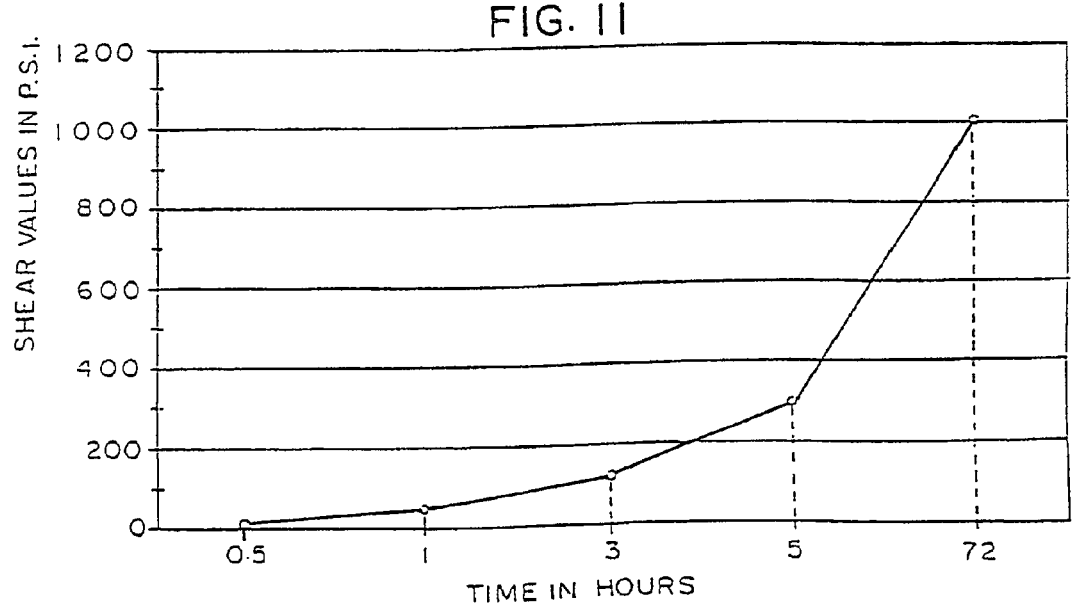
FIG. 11 is a graph of shear values versus cure time for a conventional single component urethane adhesive.

In another series of tests, lateral shear values were measured for two-bonded assemblies over the curing period of each adhesive utilized in each assembly. FIG. 10 is a graph of lateral shear values just prior to failure of bonds formed between plastic and glass, utilizing the Essex 73100 and 73002 two-component system. That graph illustrates that bonds capable of withstanding 300 psi shear, result after only 15 minutes of curing. Bonds capable of withstanding over 1000 psi shear forces result in only about 30 minutes of total cure time. As previously noted, these cure times can be accelerated by the addition of heat or chemical agents. This is remarkable and when applied in a high rate manufacturing process, is of significant commercial value. In contrast, bonds formed utilizing conventional single-component urethanes require much longer cure times. FIG. 11 illustrates shear values just prior to failure versus cure time of the Essex 57302 single-component system. In order to obtain a bond from that single-component urethane capable of bearing a shear force of 300 psi, curing must be allowed to occur for 5 hours, which is 20 times longer than the previously described Essex 73100 and 73002 two-component system. In order to obtain a bond capable of withstanding a shear force of 1000 psi, curing of the single-component urethane must be allowed to occur for 72 hours, which is 144 times longer than the previously described 73100 and 73002 two-component system.

Road Tests

The previously described window assemblies produced for Chrysler and utilizing the Essex 73100 and 73002 two-component system for bonding various attachment members to the glass panels of the assemblies, were installed as side windows in Chrysler minivans. The vehicles were then subjected to a battery of road tests and accelerated environmental performance tests by Chrysler. Installed window assemblies successfully passed Chrysler testing.

The preferred embodiment bonded assemblies and panel assemblies described herein may be incorporated in vehicles such as automobiles, trucks, vans, minivans, and utility vehicles; recreational vehicles such as motor homes, campers, and trailers; other vehicles such as buses, trolleys, trains, commuter vehicles, and airplanes; marine vehicles such as boats and other watercraft; and nearly any structure utilizing a glass panel or substrate for which there exists a need to securely adhere other components to, or to securely affix one or more glass panels thereto. Such window panel assemblies are especially useful in a variety of vehicles and especially for large area windows, and particularly for large area flush-mounted glazings, such as are used as front, rear, and side windows, and as sunroofs, in automobiles, minivans, vans, trucks, and buses and which utilize a window panel that weighs at least about 3 kilograms (with a window panel weight of at least 5 kilograms common for front and rear windows, and for side windows on minivans and larger vehicles) and with a window panel area of at least about 250 square inches.

It is contemplated that the adhesives described herein could be used to form an architectural window assembly comprising a frame containing one or more glass panels bonded to the frame by an effective amount of the adhesive, as described herein. In the preferred embodiment, the frame is formed from steel or other comparable metal. The frame may contain a plurality of glass panels to form a multi-pane architectural window. Each glass panel is bonded to the frame by an effective amount of adhesive, which preferably is the rapid set, rapid cure, two-component urethane adhesives described herein. Alternatively, or in addition, each glass panel may be bonded to a mounting rail disposed on the frame or other substrate by a layer of adhesive. It is further contemplated that the adhesives described herein could be utilized to form an architectural window assembly that does not require a frame. In this embodiment, two or more glass panels are separated by a spacer member disposed between the panels and generally along the perimeter of the panels. An effective amount of the previously described adhesive is used to bond each panel to the spacer to form the window assembly. In these architectural window assemblies, it is preferred that all condensable gases, e.g., water vapor, in the region between the panels are evacuated, or one or more inert gases injected therein to displace such gases, so that condensation does not occur in that region.

It is contemplated that the bonded assemblies described herein will find widespread application in vehicle window assemblies; architectural and residential window assemblies; home and industrial appliances including, but not limited to, washing machines, dryers, ovens, stoves, and refrigerators; and in furniture utilizing bonded glass construction.

Of course, it is understood that the foregoing are merely preferred embodiments of the invention and that various changes and alterations can be made without departing from the spirit and broader aspects thereof as set forth in the appended claims, which are to be interpreted in accordance with the principals of patent law including the Doctrine of Equivalents.

The embodiments of the invention in which an exclusive property or privilege is claimed are defined as follows:

1. A rear sliding window assembly suitable for use in a vehicle, said rear sliding window assembly comprising:
   upper and lower track members;
   a first fixed glass window panel and a second fixed glass window panel, each of said first and second fixed glass window panels having a first surface and a second surface opposite said first surface;
   wherein said rear sliding window assembly comprises a rear sliding window assembly of a pickup truck and wherein said rear sliding window assembly is configured for mounting at a rear opening of a cab of the pickup truck, and wherein said first surface of said first and second fixed glass window panels comprises an exterior surface of said first and second fixed glass window panels when said rear sliding window assembly is normally mounted at the rear opening of the cab of the pickup truck equipped with said rear sliding window assembly;
   wherein said upper and lower track members are disposed at said second surface of said first and second fixed glass window panels and wherein no portion of said upper and lower track members is in contact with said first surface of said first and second fixed glass window panels, and wherein said first fixed glass window panel is spaced from said second fixed glass window panels by a gap;
   a movable glass window panel slidably disposed at said upper and lower track members and movable at least partially along said upper and lower track members relative to said first and second fixed glass window panels;
   wherein said movable glass window panel is movable between opened and closed positions, and wherein said movable glass window panel is disposed at said gap that is between said first and second fixed glass window panels when in said closed position;
   wherein a lower perimeter edge of said movable glass window panel is received by a lower glide member, and wherein said lower glide member is disposed in said lower track member to facilitate sliding of said movable glass window panel at least partially along said lower track member; and
   a gasket disposed at a perimeter portion of said window assembly, wherein said gasket comprises a rigid polymeric material, and wherein said gasket comprises at least one fastener for at least partially attaching said window assembly to the equipped vehicle.

2. The rear sliding window assembly of claim 1 further comprising a sealing member disposed between said second surface of said first fixed glass window panel and an opposing surface of said movable glass window panel at least when said movable glass window panel is in its closed position, wherein said sealing member seals between said first fixed glass window panel and said movable glass window panel at least when said movable glass window panel is in its closed position.

3. The rear sliding window assembly of claim 2, wherein said sealing member is attached at one of said first fixed glass window panel and said movable glass window panel, and wherein said sealing member comprises a sealing portion that sealingly engages the other of said first fixed glass window panel and said movable glass window panel.

4. The rear sliding window assembly of claim 3, wherein said sealing member is attached to said one of said first fixed glass window panel and said movable glass window panel by adhesively attaching said sealing member to said one of said first fixed glass window panel and said movable glass window panel.

5. The rear sliding window assembly of claim 3, wherein said sealing portion comprises at least one lip.

6. The rear sliding window assembly of claim 1, wherein a sealing gasket is disposed around at least a portion of a perimeter of the rear opening of the cab of the pickup truck when said window assembly is attached to the equipped vehicle.

7. The rear sliding window assembly of claim 6, wherein said sealing gasket is disposed between said rear sliding window assembly and a portion of the body of the equipped vehicle.

8. The rear sliding window assembly of claim 6, wherein said sealing gasket comprises a bulbous seal.

9. The rear sliding window assembly of claim 1, wherein said gasket comprises a plurality of fasteners for at least partially attaching said window assembly to the equipped vehicle.

10. The rear sliding window assembly of claim 1, wherein said at least one fastener comprises at least one threaded fastener.

11. The rear sliding window assembly of claim 1, wherein said at least one fastener comprises a head portion and an elongated portion, and wherein said head portion is encased in said gasket and at least part of said elongated portion protrudes from said gasket for at least partially attaching said window assembly to the equipped vehicle.

12. The rear sliding window assembly of claim 11, wherein part of said elongated portion is encased in said gasket.

13. The rear sliding window assembly of claim 11, wherein at least said elongated portion protruding from said gasket comprises a threaded portion.

14. The rear sliding window assembly of claim 1 further comprising a pair of members that are disposed between said upper and lower track members, wherein said pair of members are generally vertically oriented when said window assembly is attached to the equipped vehicle and when said upper and lower track members are oriented generally horizontally.

15. The rear sliding window assembly of claim 14, wherein said pair of members are attached to said movable panel.

16. The rear sliding window assembly of claim 1, wherein an upper perimeter edge of said movable glass window panel is received by an upper glide member, and wherein said upper glide member is disposed in said upper track member to facilitate sliding of said movable glass window panel at least partially along said upper track member.

17. The rear sliding window assembly of claim 1 further comprising a first latch element adhesively attached at said second surface of said first fixed glass window panel and a second latch element adhesively attached at said movable glass window panel, wherein said first and second latch elements cooperate to retain said movable glass window panel relative to said first fixed glass window panel when said movable glass window panel is in a closed position.

18. The rear sliding window assembly of claim 1, wherein said first and second fixed glass window panels comprise tempered glass, and wherein said movable glass window panel comprises tempered glass.

19. The rear sliding window assembly of claim 18, wherein said upper and lower track members are attached to said second surface of said first and second fixed glass window panels.

20. The rear sliding window assembly of claim 19, wherein said upper and lower track members are adhesively attached to said second surface of said first and second fixed glass window panels.

21. The rear sliding window assembly of claim 20, wherein said upper and lower track members are adhesively attached to said second surface of said first and second fixed glass window panels via a urethane adhesive.

22. The rear sliding window assembly of claim 1, wherein each of said upper and lower track members has a length, a width and a height, and wherein said movable glass window panel is slidable longitudinally at least partially along the lengths of said upper and lower track members within respective channels therein.

23. The rear sliding window assembly of claim 22, wherein said lower glide member is located at least partially within said lower track member and is slidable at least partially along the length of said lower track member.

24. The rear sliding window assembly of claim 23, wherein said movable glass window panel is carried by said lower glide member between its opened and closed positions.

25. The rear sliding window assembly of claim 23, wherein a width of said lower glide member is sized to fit within said lower track member so that said lower glide member can longitudinally move within said lower track member.

26. The rear sliding window assembly of claim 25, wherein a bottom surface of said lower glide member is generally planar and sized to engage an upper surface of said lower track member so that said lower glide member is supported by and is longitudinally slidable at least partially along said lower track member.

27. The rear sliding window assembly of claim 1 further comprising a layer of frit disposed on said second surface of said first and second fixed glass window panels at least where said upper and lower track members are disposed.

28. A rear sliding window assembly suitable for use in a vehicle, said rear sliding window assembly comprising:
  upper and lower track members;
  at least a first fixed glass window panel having a first surface and a second surface opposite said first surface;
  wherein said upper and lower track members are disposed at said second surface of said first fixed glass window panel and wherein no portion of said upper and lower track members is in contact with said first surface of said first fixed glass window panel;
  wherein said rear sliding window assembly comprises a rear sliding window assembly of a pickup truck and wherein said rear sliding window assembly is configured for mounting at a rear opening of a cab of the pickup truck, and wherein said first surface of said first fixed glass window panel comprises an exterior surface of said first fixed glass window panel when said rear sliding window assembly is normally mounted at the rear opening of the cab of the pickup truck equipped with said rear sliding window assembly;
  a movable glass window panel slidably disposed at said upper and lower track members and movable at least partially along said upper and lower track members relative to said first fixed glass window panel;
  wherein a perimeter edge of said movable glass window panel is received by a glide member and wherein said glide member is disposed in one of said upper and lower track members to facilitate sliding of said movable glass window panel at least partially along said one of said upper and lower track members; and
  a gasket disposed at a perimeter portion of said window assembly.

29. The rear sliding window assembly of claim 28, wherein said upper and lower tracks are secured to said second surface of said first fixed glass window panel without drilling holes through said first fixed glass window panel.

30. The rear sliding window assembly of claim 29, wherein said upper and lower tracks are adhesively attached to said second surface of said first fixed glass window panel.

31. The rear sliding window assembly of claim 28, wherein said gasket is disposed at least partially around a periphery of said first fixed glass window panel.

32. The rear sliding window assembly of claim 31, wherein said gasket is disposed at least along an upper region of said first fixed glass window panel and a lower region of said first fixed glass window panel.

33. The rear sliding window assembly of claim 28, wherein said gasket is configured, at least in part, for attaching said window assembly to the equipped vehicle.

34. The rear sliding window assembly of claim 33, wherein said gasket comprises a rigid polymeric material.

35. The rear sliding window assembly of claim 34, wherein said configuration of said gasket comprises at least one fastener for at least partially attaching said window assembly to the equipped vehicle.

36. The rear sliding window assembly of claim 28, wherein said gasket at least in part comprises a flexible polymeric material.

37. The rear sliding window assembly of claim 28, wherein said gasket encompasses said upper and lower track members.

38. The rear sliding window assembly of claim 28, wherein said gasket is disposed at said second surface of said first fixed glass window panel prior to installation of said rear sliding window assembly at the equipped vehicle and without contact of said gasket on said first surface of said first fixed glass window panel.

39. The rear sliding window assembly of claim 28, wherein said first fixed glass window panel comprises tempered glass, and wherein said movable glass window panel comprises tempered glass.

40. The rear sliding window assembly of claim 28 further comprising a sealing member disposed between said second surface of said first fixed glass window panel and an opposing surface of said movable glass window panel.

41. The rear sliding window assembly of claim 40, wherein said sealing member seals against said movable glass window panel at least when said movable glass window panel is in a closed position.

42. The rear sliding window assembly of claim 28, wherein said upper track member comprises an upper channel that is configured to at least partially receive an upper perimeter region of said movable glass window panel and wherein said lower track member comprises a lower channel that is configured to at least partially receive a lower perimeter region of said movable glass window panel.

43. The rear sliding window assembly of claim 28, wherein said movable glass window panel is manually slidable between said upper and lower track members.

44. The rear sliding window assembly of claim 28, wherein a lower perimeter edge of said movable glass window panel is received by said glide member and wherein said glide member is disposed in said lower track member.

45. The rear sliding window assembly of claim 44, wherein an upper perimeter edge of said movable glass window panel is received by an upper glide member and wherein said upper glide member is disposed in said upper track member.

46. The rear sliding window assembly of claim 28, wherein said glide member comprises a plastic glide member.

47. The rear sliding window assembly of claim 46, wherein said glide member comprises a low friction plastic glide member.

48. The rear sliding window assembly of claim 46, wherein said glide member comprises a generally U-shaped member that receives said perimeter edge of said movable glass window panel therein.

49. The rear sliding window assembly of claim 28 further comprising a second fixed glass window panel having a first surface and a second surface opposite said first surface, and wherein said upper and lower track members are disposed at said second surface of said second fixed glass window panel and wherein no portion of said upper and lower track members is in contact with said first surface of said second fixed glass window panel.

50. The rear sliding window assembly of claim 49, wherein said movable glass window panel, when closed, is disposed at least partially between said first fixed glass window panel and said second fixed glass window panel and at a gap that is between said first fixed glass window panel and said second fixed glass window panel.

51. A rear sliding window assembly suitable for use in a vehicle, said rear sliding window assembly comprising:
  upper and lower track members;
  a fixed glass window panel having a first surface and a second surface opposite said first surface, wherein said fixed glass window panel is attached to said upper and lower track members by an adhesive disposed between said second surface of said fixed glass window panel and said upper and lower track members;
  a movable glass window panel movably disposed at said upper and lower track members and movable at least partially along said upper and lower track members relative to said fixed glass window panel; and
  a first latch element adhesively attached to said fixed glass window panel and a second latch element adhesively attached to said movable glass window panel, wherein said first and second latch elements cooperate to retain said movable glass window panel relative to said fixed glass window panel when said movable glass window panel is in a closed position.

52. The rear sliding window assembly of claim 51, wherein said first surface of said fixed glass window panel comprises an exterior surface of said fixed glass window panel when said rear sliding window assembly is normally mounted in a vehicle.

53. The rear sliding window assembly of claim 52, wherein said rear sliding window assembly comprises a rear sliding window assembly of a pickup truck and wherein said rear sliding window assembly is configured for mounting at a rear opening of a cab of a pickup truck.

54. The rear sliding window assembly of claim 53 further comprising a second fixed glass window panel attached to said upper and lower track members by said adhesive disposed between a second surface of said second fixed glass window panel and said upper and lower track members.

55. The rear sliding window assembly of claim 51 further comprising a gasket disposed at a perimeter portion of said window assembly, wherein said gasket is, at least in part, for mounting said window assembly to the vehicle, and wherein said gasket comprises at least one fastener for at least partially attaching said window assembly to the vehicle.

56. The rear sliding window assembly of claim 55, wherein an adhesive attaches said gasket to said second surface of said fixed glass window panel prior to installation of said rear sliding window assembly at the vehicle and without contact of said gasket on said first surface of said fixed glass window panel.

57. The rear sliding window assembly of claim 51 further comprising an upper layer of frit and a lower layer of frit disposed on said second surface of said fixed glass window panel, wherein said upper layer of frit is disposed between said second surface of said fixed glass window panel and said adhesive that attaches said fixed glass window panel to said upper track member such that said adhesive attaches said upper track member directly to said upper layer of frit, and wherein said lower layer of frit is disposed between said second surface and said adhesive that attaches said fixed glass window panel to said lower track member such that said adhesive attaches said lower track member directly to said lower layer of frit.

58. The rear sliding window assembly of claim 57, wherein said upper and lower layers of frit comprise a common layer of frit disposed on said second surface at least partially around a periphery of said fixed glass window panel.

59. The rear sliding window assembly of claim 58, wherein said fixed glass window panel comprises tempered glass.

60. The rear sliding window assembly of claim 51 further comprising a sealing member disposed between said second surface of said fixed glass window panel and an opposing surface of said movable glass window panel.

61. The rear sliding window assembly of claim 60, wherein said sealing member is adhesively attached to said movable window panel, and wherein said sealing member comprises a sealing portion that sealingly engages said fixed glass window panel.

62. The rear sliding window assembly of claim 61, wherein said sealing portion comprises at least one lip.

63. The rear sliding window assembly of claim 51, wherein said upper track member comprises an upper channel that is configured to at least partially receive an upper perimeter region of said movable glass window panel and wherein said lower track member comprises a lower channel that is configured to at least partially receive a lower perimeter region of said movable glass window panel.

64. The rear sliding window assembly of claim 51, wherein said movable glass window panel is manually slidable between said upper and lower track members.

65. The rear sliding window assembly of claim 51, wherein a perimeter edge of said movable glass window panel is received by a glide member disposed in one of said upper and lower track members to facilitate sliding of said movable glass window panel at least partially along said one of said upper and lower track members, and wherein said glide member comprises a plastic glide member.

66. The rear sliding window assembly of claim 65, wherein said glide member comprises a low friction plastic glide member.

67. The rear sliding window assembly of claim 51 further comprising at least one of an adhesive promoter and a primer disposed between said fixed glass window panel and said adhesive that attaches said fixed glass window panel to said upper and lower track members.

68. The rear sliding window assembly of claim 51, wherein said adhesive comprises a urethane adhesive.

69. A rear sliding window assembly suitable for use in a vehicle, said rear sliding window assembly comprising:
- upper and lower track members;
- a first fixed glass window panel and a second fixed glass window panel, each of said first and second fixed glass window panels having a first surface and a second surface opposite said first surface;
- wherein said rear sliding window assembly comprises a rear sliding window assembly of a pickup truck and wherein said rear sliding window assembly is configured for mounting at a rear opening of a cab of the pickup truck, and wherein said first surface of said first and second fixed glass window panels comprises an exterior surface of said first and second fixed glass window panels when said rear sliding window assembly is normally mounted at the rear opening of the cab of the pickup truck equipped with said rear sliding window assembly;
- wherein said upper and lower track members are disposed at said second surface of said first and second fixed glass window panels and wherein no portion of said upper and lower track members is in contact with said first surface of said first and second fixed glass window panels, and wherein said first fixed glass window panel is spaced from said second fixed glass window panels by a gap;
- a movable glass window panel slidably disposed at said upper and lower track members and movable at least partially along said upper and lower track members relative to said first and second fixed glass window panels;
- wherein said movable glass window panel is movable between opened and closed positions, and wherein said movable glass window panel is disposed at said gap that is between said first and second fixed glass window panels when in said closed position;
- a sealing member disposed between said second surface of said first fixed glass window panel and an opposing surface of said movable glass window panel at least when said movable glass window panel is in its closed position, wherein said sealing member seals between said first fixed glass window panel and said movable glass window panel at least when said movable glass window panel is in its closed position;
- wherein said sealing member is attached at one of said first fixed glass window panel and said movable glass window panel, and wherein said sealing member comprises a sealing portion that sealingly engages the other of said first fixed glass window panel and said movable glass window panel; and
- a gasket disposed at a perimeter portion of said window assembly, wherein said gasket comprises a rigid polymeric material, and wherein said gasket comprises at least one fastener for at least partially attaching said window assembly to the equipped vehicle.

70. The rear sliding window assembly of claim 69, wherein a perimeter edge of said movable glass window panel is received by a glide member, and wherein said glide member is disposed in one of said upper and lower track members to facilitate sliding of said movable glass window panel at least partially along said one of said upper and lower track members.

71. The rear sliding window assembly of claim 70, wherein each of said upper and lower track members has a length, a width and a height, and wherein said movable glass window panel is slidable longitudinally at least partially along the lengths of said upper and lower track members within respective channels therein.

72. The rear sliding window assembly of claim 71, wherein said glide member is located at least partially within said lower track member and is slidable at least partially along the length of said lower track member, and wherein said movable glass window panel is carried by said glide member between its opened and closed positions.

73. The rear sliding window assembly of claim 72, wherein a width of said glide member is sized to fit within said lower track member so that said lower glide member can longitudinally move within said lower track member.

74. The rear sliding window assembly of claim 73, wherein a surface of said glide member is generally planar and sized to engage a surface of said lower track member so that said glide member is supported by and is longitudinally slidable at least partially along said lower track member.

75. The rear sliding window assembly of claim 69, wherein said sealing member is attached at said one of said first fixed glass window panel and said movable glass window panel by adhesively attaching said sealing member to said one of said first fixed glass window panel and said movable glass window panel.

76. The rear sliding window assembly of claim 69, wherein said sealing portion comprises at least one lip.

77. A rear sliding window assembly suitable for use in a vehicle, said rear sliding window assembly comprising:
- upper and lower track members;
- a first fixed glass window panel and a second fixed glass window panel, each of said first and second fixed glass window panels having a first surface and a second surface opposite said first surface;
- wherein said rear sliding window assembly comprises a rear sliding window assembly of a pickup truck and wherein said rear sliding window assembly is configured for mounting at a rear opening of a cab of the pickup truck, and wherein said first surface of said first and second fixed glass window panels comprises an exterior surface of said first and second fixed glass window panels when said rear sliding window assembly is normally mounted at the rear opening of the cab of the pickup truck equipped with said rear sliding window assembly;
- wherein said upper and lower track members are disposed at said second surface of said first and second fixed glass window panels and wherein no portion of said upper and lower track members is in contact with said first surface of said first and second fixed glass window panels, and wherein said first fixed glass window panel is spaced from said second fixed glass window panels by a gap;
- a movable glass window panel slidably disposed at said upper and lower track members and movable at least partially along said upper and lower track members relative to said first and second fixed glass window panels;
- wherein said movable glass window panel is movable between opened and closed positions, and wherein said movable glass window panel is disposed at said gap that is between said first and second fixed glass window panels when in said closed position;
- a sealing member disposed between said second surface of said first fixed glass window panel and an opposing surface of said movable glass window panel at least when said movable glass window panel is in its closed position, wherein said sealing member seals between said first fixed glass window panel and said movable glass window panel at least when said movable glass window panel is in its closed position;
- wherein said sealing member is attached at one of said first fixed glass window panel and said movable glass window panel, and wherein said sealing member comprises a sealing portion that sealingly engages the other of said first fixed glass window panel and said movable glass window panel; and a gasket disposed at a perimeter portion of said window assembly.

78. The rear sliding window assembly of claim 77, wherein a perimeter edge of said movable glass window panel is received by a glide member, and wherein said glide member is disposed in one of said upper and lower track members to facilitate sliding of said movable glass window panel at least partially along said one of said upper and lower track members.

79. The rear sliding window assembly of claim 77, wherein said sealing member is attached at said one of said first fixed glass window panel and said movable glass window panel by adhesively attaching said sealing member to said one of said first fixed glass window panel and said movable glass window panel.

80. The rear sliding window assembly of claim 77, wherein said sealing portion comprises at least one lip.

81. The rear sliding window assembly of claim 77, wherein said gasket comprises a rigid polymeric material and wherein said gasket comprises at least one fastener for at least partially attaching said window assembly to the equipped vehicle.

82. A rear sliding window assembly suitable for use in a vehicle, said rear sliding window assembly comprising:
  upper and lower track members;
  a first fixed glass window panel and a second fixed glass window panel, each of said first and second fixed glass window panels having a first surface and a second surface opposite said first surface;
  wherein said rear sliding window assembly comprises a rear sliding window assembly of a pickup truck and wherein said rear sliding window assembly is configured for mounting at a rear opening of a cab of the pickup truck, and wherein said first surface of said first and second fixed glass window panels comprises an exterior surface of said first and second fixed glass window panels when said rear sliding window assembly is normally mounted at the rear opening of the cab of the pickup truck equipped with said rear sliding window assembly;
  wherein said upper and lower track members are disposed at said second surface of said first and second fixed glass window panels and wherein no portion of said upper and lower track members is in contact with said first surface of said first and second fixed glass window panels, and wherein said first fixed glass window panel is spaced from said second fixed glass window panels by a gap;
  a movable glass window panel slidably disposed at said upper and lower track members and movable at least partially along said upper and lower track members relative to said first and second fixed glass window panels;
  wherein said movable glass window panel is movable between opened and closed positions, and wherein said movable glass window panel is disposed at said gap that is between said first and second fixed glass window panels when in said closed position;
  wherein a perimeter edge of said movable glass window panel is received by a glide member and wherein said glide member is disposed in one of said upper and lower track members to facilitate sliding of said movable glass window panel at least partially along said one of said upper and lower track members; and
  a sealing member disposed between said second surface of said first fixed glass window panel and an opposing surface of said movable glass window panel at least when said movable glass window panel is in its closed position, wherein said sealing member seals between said first fixed glass window panel and said movable glass window panel at least when said movable glass window panel is in its closed position.

83. The rear sliding window assembly of claim 82, wherein said sealing member is attached at one of said first fixed glass window panel and said movable glass window panel, and wherein said sealing member comprises a sealing portion that sealingly engages the other of said first fixed glass window panel and said movable glass window panel.

84. The rear sliding window assembly of claim 83, wherein said sealing member is attached to said one of said first fixed glass window panel and said movable glass window panel by adhesively attaching said sealing member to said one of said first fixed glass window panel and said movable glass window panel.

85. The rear sliding window assembly of claim 82 further comprising a gasket disposed at a perimeter portion of said window assembly, wherein said gasket comprises a rigid polymeric material.

86. The rear sliding window assembly of claim 85, wherein said gasket comprises at least one fastener for at least partially attaching said window assembly to the equipped vehicle.

87. The rear sliding window assembly of claim 86, wherein said at least one fastener comprises a head portion and an elongated portion, and wherein said head portion is encased in said gasket and at least part of said elongated portion protrudes from said gasket for at least partially attaching said window assembly to the equipped vehicle, and wherein part of said elongated portion is encased in said gasket.

88. The rear sliding window assembly of claim 87, wherein at least said elongated portion protruding from said gasket comprises a threaded portion.

89. The rear sliding window assembly of claim 82, wherein a lower perimeter edge of said movable glass window panel is received by said glide member and wherein said glide member is disposed in said lower track member.

90. The rear sliding window assembly of claim 89, wherein an upper perimeter edge of said movable glass window panel is received by an upper glide member and wherein said upper glide member is disposed in said upper track member.

91. The rear sliding window assembly of claim 89, wherein said glide member is located at least partially within said lower track member and is slidable at least partially along the length of said lower track member within a channel therein.

92. The rear sliding window assembly of claim 91, wherein a width of said glide member is sized to fit within said lower track member so that said glide member can longitudinally move within said lower track member.

93. The rear sliding window assembly of claim 92, wherein a bottom surface of said glide member is generally planar and sized to engage an upper surface of said lower track member so that said glide member is supported by and is longitudinally slidable at least partially along said lower track member.

94. The rear sliding window assembly of claim 93, wherein said glide member comprises a plastic glide member.

95. The rear sliding window assembly of claim 94, wherein said movable glass window panel is carried by said glide member between its opened and closed positions.

96. The rear sliding window assembly of claim 94, wherein said glide member comprises a low friction plastic glide member.

97. The rear sliding window assembly of claim 82, wherein said upper and lower track members are adhesively attached to said second surface of said first and second fixed glass window panels.

98. The rear sliding window assembly of claim 82 further comprising a layer of frit disposed on said second surface of said first and second fixed glass window panels at least where said upper and lower track members are disposed.

99. A rear sliding window assembly suitable for use in a vehicle, said rear sliding window assembly comprising:
- upper and lower track members;
- a first fixed glass window panel and a second fixed glass window panel, each of said first and second fixed glass window panels having a first surface and a second surface opposite said first surface;
- wherein said rear sliding window assembly comprises a rear sliding window assembly of a pickup truck and wherein said rear sliding window assembly is configured for mounting at a rear opening of a cab of the pickup truck, and wherein said first surface of said first and second fixed glass window panels comprises an exterior surface of said first and second fixed glass window panels when said rear sliding window assembly is normally mounted at the rear opening of the cab of the pickup truck equipped with said rear sliding window assembly;
- wherein said upper and lower track members are disposed at said second surface of said first and second fixed glass window panels and wherein no portion of said upper and lower track members is in contact with said first surface of said first and second fixed glass window panels, and wherein said first fixed glass window panel is spaced from said second fixed glass window panels by a gap;
- a movable glass window panel slidably disposed at said upper and lower track members and movable at least partially along said upper and lower track members relative to said first and second fixed glass window panels;
- wherein said movable glass window panel is movable between opened and closed positions, and wherein said movable glass window panel is disposed at said gap that is between said first and second fixed glass window panels when in said closed position;
- wherein a perimeter edge of said movable glass window panel is received by a glide member to facilitate sliding of said movable glass window panel at least partially along said lower track member;
- wherein said glide member is located at least partially within said lower track member and is slidable at least partially along the length of said lower track member within a channel therein; and
- wherein said glide member comprises a plastic glide member.

100. The rear sliding window assembly of claim 99, wherein said movable glass window panel is carried by said glide member between its opened and closed positions.

* * * * *

UNITED STATES PATENT AND TRADEMARK OFFICE
CERTIFICATE OF CORRECTION

PATENT NO.        : 8,048,529 B2
APPLICATION NO.   : 12/946314
DATED             : November 1, 2011
INVENTOR(S)       : Jeffrey A. Lewno Page 1 of 1

It is certified that error appears in the above-identified patent and that said Letters Patent is hereby corrected as shown below:

Column 1
Line 38, "devises" should be --clevises--

Column 3
Line 3, "devises" should be --clevises--

Column 6
Line 29, "devises" should be --clevises--

Column 7
Line 4, "fit" should be --frit--

Column 11
Line 19, "flit" should be --frit--
Line 27, Insert --.-- after --drying--

Column 16
Line 33, "fit" should be --frit--

Column 18
Line 50, "Table I" should be --Table 1--

Column 20
Line 10, "devises" should be --clevises--

Column 22
Line 50, "hi" should be --In--

Signed and Sealed this
Eighteenth Day of September, 2012

David J. Kappos
*Director of the United States Patent and Trademark Office*